(12) United States Patent
Johnson

(10) Patent No.: US 6,324,586 B1
(45) Date of Patent: Nov. 27, 2001

(54) SYSTEM FOR SYNCHRONIZING MULTIPLE COMPUTERS WITH A COMMON TIMING REFERENCE

(75) Inventor: Aric R. Johnson, Ft. Collins, CO (US)

(73) Assignees: Jennifer Wallace; Aric Johnson, both of Fort Collins, CO (US)

( * ) Notice: Subject to any disclaimer, the term of this patent is extended or adjusted under 35 U.S.C. 154(b) by 0 days.

(21) Appl. No.: 09/154,818

(22) Filed: Sep. 17, 1998

(51) Int. Cl.7 .................................................. G06F 15/16

(52) U.S. Cl. ........................ 709/248; 342/352; 342/356

(58) Field of Search ............................. 709/248; 342/352, 342/354, 356, 358, 381, 384, 442, 451, 153, 157; 375/356; 701/215; 343/745; 706/22, 21, 17

(56) References Cited

U.S. PATENT DOCUMENTS

| | | | |
|---|---|---|---|
| 4,882,739 | 11/1989 | Potash et al. | 375/109 |
| 4,893,316 | 1/1990 | Jane et al. | 375/44 |
| 4,893,318 | 1/1990 | Potash et al. | 375/109 |
| 5,386,542 | 1/1995 | Brann et al. | 395/550 |
| 5,534,882 | 7/1996 | Lopez | 343/891 |
| 5,587,715 | * 12/1996 | Lewis | 342/357 |
| 5,600,632 | 2/1997 | Schulman | 370/252 |
| 5,701,446 | 12/1997 | Abali et al. | 395/551 |
| 5,727,034 | 3/1998 | Ojaniemi | 375/356 |
| 5,734,985 | 3/1998 | Ito et al. | 455/503 |
| 5,757,786 | 5/1998 | Joo | 370/324 |
| 5,774,831 | 6/1998 | Gupta | 701/214 |
| 6,160,858 | * 12/2000 | Hindman et al. | 375/336 |
| 6,185,205 | * 2/2001 | Sharrit et al. | 370/389 |

OTHER PUBLICATIONS

"Gigabit Ethernet: The Strategic Alternative for LANS and Intranets"; Gigabit Ethernet Overview—May 1097; www.gigabit-ethernet.org; Apr. 3, 1098.

"Ethernet: The Dominant Network Technology"; Gigabit Ethernet Overview—May 1097; www.gigabit-ethernet.org; Apr. 3, 1998.

"Fibre Channel Overview" by Zoltan Meggyesi; Research Institute for Particle and Nuclear Physics; www.cern.ch.

"Gigabit Ethernet Migration"; Gigabit Ethernet Overview—May 1997; www.gigabit-ethernet.org; Apr. 3, 1998.

"On the Accuracy and Stability of Clocks Synchronized by the Network Time Protocol in the Internet System" by David L. Mills; ACM Computer Communication Review 20, 1; Jan. 1990; pp. 65–75.

"Nerwork Time Synchronization" by David L. Mills; Reprint RFC 1129; Oct. 1989.

"Network Time Protocol" by David L. Mills; Reprint.

"India Prepares Homemade Supercomputer Network" by Uday Pai, Techweb; Aug. 4, 1998; www.techweb.com.

(List continued on next page.)

Primary Examiner—Mehmet B. Geckil
(74) Attorney, Agent, or Firm—Lathrop & Gage L.C.; Daniel N. Fishman

(57) ABSTRACT

A synchronized timing system is disclosed for one or more of a plurality of network interconnected computers. The system utilizes a global satellite system and includes a receiver device for detecting out-of-phase signals from a plurality of satellite sources of the satellite system. A mechanism is provided for processing and phase correlating these signals to generate a single absolute time reference signal therefrom. An interface device is disposed in each computer for receiving the reference signal and adapting this signal as the internal master clock reference for the operating system of the computer. Finally, a mechanism interconnects each computer in the network of computers to synchronize the internal master clocks of the computers to the absolute time reference signal to create a plurality of network interconnected time synchronized computers. These computers may be additionally time synchronized and interconnected to other networks of computers through a global communication system such as the global Internet.

42 Claims, 22 Drawing Sheets

OTHER PUBLICATIONS

"C–DAC PARAM OpenFrame Supercomputer"; Aug. 5, 1998; www.unipers.com.

"Research & Development–Microsoft Invests In The Millenium" article by Stuart J. Johnson, Techweb; Jun. 29, 1998; www.techweb.com.

"Microsoft Invests In Future of Distributed Computing" article by Rich Levin, Techweb; Mar. 16, 1998; www.techweb.com.

"Web Consortium Mulls XML Proposal" article by Richard Karpinski; Techweb; May 15, 1998; www.techweb.com.

"XML: The 'Golden Arches' of Computers?" by J.P. Morgenthal; Internet Week article dated Feb. 23, 1998; www.techweb.com.

"Complexity Rises with Member Roll—Internet2 Faces Engineering Hurdles" by Larry Lange; TechWeb News article dated Jun. 1, 1998; www.techweb.com.

"Alpha + Linux = Supercomputer For Less" by Andy Patrizio; TechWeb News Article dated Jul. 6, 1998; www.techweb.com.

"LAN"; a TechWeb Technology Encyclopedia article; Jul. 6, 1998; www.techweb.com.

"client/server"; a TechWeb Technology Encyclopedia article; Jul. 6, 1998; www.techweb.com.

"gateway"; a TechWeb Technology Encyclopedia article; Jul. 6, 1998; www.techweb.com.

"Government, University and Technology Leaders Deliver World's Most Advanced IP Backbone Network" by Greg Wood and Erin McKelvey; a University Corp. for Advanced Internet Development news release; Apr. 14, 1998; www.ucaid.edu.

"Why Digital Networks are Better with GPS Synchronization" by Edward Spivak; an Absolute Time Corp. release; Jun. 30, 1998; www.absolutetime.com.

"Executive Summary—Computer Network Time Synchronization" by David L. Mills; May 12, 1998; www.eecis.udel.edu.

"Internet Stratum One GPS Network Time Server: A Commercial Embodiment" by David C. Robinson; a Datum Inc. release; Jun. 30, 1998; www.absolutetime.com.

"Reach Out and Touch Someone" by Edgar W. Butterline; an AT&T release; Apr. 18, 1998; www.absolutetime.com.

"Consortium Prepares for Networks Yet to Be Envisioned" by Robyn Meredith; CyberTimes article; Feb. 2, 1998; www.nytimes.com.

"Quest Network Becomes an Additional Backbone for Internet2 Project 'Abilene'. . ." a Quest Corporation news release; Business Wire, Apr. 14, 1998; www.pathfinder.com.

"The Scientific Workstation of the Future May be a Pile of PCs" by Thomas Sterling; Communications of the Association for Computing Machinery, Sep. 1996, v39, n9, p11.

"Global Nervous System" by Kevin Kelly and Spencer Reiss; Wired Magazine, Aug. 1998 issue, pp. 2–9.

"Jini Technology Grants the Ultimate Wish" by Jon Byous; a Sun Microsystems, Inc. release; Jul. 21, 1998; www.java.sun.com.

"Jini Architecture Overview" by Jim Waldo; a Sun Microsystems, Inc. release; 1998.

"Sun's 'Jini': A Magician That Makes PC Gear 'Network Citizens'?" by Rob Hof; Business Week Online, Jul. 15, 1998.

"Sun' Gettin Jini Wid It", a Wired News report, Jul. 15, 1998.

"Network Time Protocol" by David L. Mills; NTP Reference Library; May 25, 1998; www.eecis.udel.edu.

"New Sun Technology to Extend PC Power" by Miguel Helft; Mercury News report; Jul. 14, 1998.

"Patched PCs Aip Up Speed Proze" by John Fleck; The Albuquerque Journal of Science & Technology; Jun. 18, 1998; www.abqjournal.com.

"Los Alamos Mail–Order Supercomputer Among World's Fastest" by Jim Danneskiold; Avalon news release dated Jun. 18, 1998; www.cnls.lanl.gov.

"Do–It–Yourself Supercomputers" by Dan Greenberg; aWired News report, Jul. 3, 1998; www.wired.com.

"I'm Not Going to Pay a Lot for This Super Computer" by Jim Hill et al.; web reprint from the Linux Journal, Dec. 1997 issue; www.ssc.com.

"Parallel Supercomputers with Commodity Components" by Michael S. Warren et al.; reprint from the Proceedings of the International Conference on Parallel and Distributed Processing Techniques and Applications, pp. 1372–1381, 1997; http://loki–www.lanl.gov.

"Network RAM: Serverless Network Memory Service"; an article on the Berkeley NOW project; http://now.cs.berkeley.edu.

"New Product from Sun Microsystems Allows Supercomputing at Home" by John Markhoff; a Suns Microsystems, Inc, news release; Jul. 15, 1998.

"Microprocessor Simulation of Neural Networks" by Helene Paugam–Moisy; The Handbook of Brain Theory and Neural Networks; Michael A. Arbib, editor; The MIT Press, Cambridge, MA; 1995.

* cited by examiner

SYSTEM FOR SYNCHRONIZING MULTIPLE COMPUTERS WITH A COMMON TIMING REFERENCE

BACKGROUND OF THE INVENTION

1. Field of the Invention

The present invention relates generally to computer synchronization systems and, more particularly, to time synchronization systems for interacting computers. Specifically, the present invention relates to an improved time synchronization system for enhancing the speed and flow of data transmission between interacting computers over a network and the Internet.

2. Description of the Prior Art

All computers function by toggling bits on and off according to the pulse of a master clock that cycles the CPU through steps of a program. The CPU controls all of the various functions of the computer. The faster the master clock, the faster the computer is able to perform calculations. Synchronization within the computer allows bits to be organized into bytes, which are strings of binary numbers that represent commands or data, and the bytes can be transferred to different areas of the computer to perform different functions. Modern computers measure clock speed in MHz, or millions of cycles per second.

Bytes are transferred between computers using data transfer mechanisms such as modems or other types of network protocols. Speeds of typical modem access, which most people use to interface with a network or the global Internet, are measured in KBS or thousands of bytes per second. There are many applications in which it is either necessary or desirable to distribute the acquisition or processing of data over a number of computer-controlled stations or processors. In order to maintain time synchronization between the data and control streams of the computers or processors, current systems generally depend on shared hardware for their synchronization or wireless transmission of time information from a common clock to each of the stations. In such cases, uncertainty due to communications delay determines the overall error in time resolution of the system.

In a system having multiple computers or stations, it is desirable for each station or computer to have its own clock so that the computer's CPU can continue operating even if synchronization with a common clock is temporarily lost. However, such clocks may operate at slightly different frequencies, further compounding the time resolution/synchronization problem.

Numerous arrangements have been proposed to address the computer time synchronization problem. Master/slave clock arrangements have been proposed including those using satellites such as illustrated in the U.S. Pat. No. 4,882,739. In addition, time synchronization apparatus and methods using the global positioning satellite (GPS) system have also been proposed as in U.S. Pat. Nos. 5,757,786 and 5,440,313, and in the AT&T Primary Reference Clock (PRC) system. Also, the Network Time Protocol (NTP) is used in the Internet to synchronize individual computers to national standard time by providing a time stamp from primary time servers and provides accuracy's generally in the range of a millisecond or two in Local-Area Networks (LANs) and up to a few tens of milliseconds in global Wide-Area Networks (WANs). However, while global positioning satellite receivers have a timing resolution accurate to 1 Ns, or one billionth of a second, the timing synchronization between computers has still not been adequately coordinated and controlled.

In addition, massively parallel supercomputers requiring high-speed computer interaction have been and are continuing to be developed. Beowulf parallel workstations include numerous computers at one location, called pile of PCs, tied together in a high-speed LAN system thereby achieving supercomputing performance. Avalon, being developed at the Los Alamos National Laboratory, is another supercomputing pile of PCs consisting of about 70 desktop computers linked together in a LAN. Jini technology, being developed by Sun Microsystems, represents a dynamic distributed system wherein software development provides the ability to establish communication, sharing and exchange of services between any hardware or software on a network. "Param-10,000" is a new supercomputer being developed by India's Center for Development of Advanced Computing and is to be the main node for a new supercomputer WAN called Paramnet which will be accessible through the global Internet. Finally, Microsoft is developing a software based self-tuning operating system for running applications across PCs, termed "Millennium". As a result of the above, it is clear that there remains an increasing need for a timing synchronization scheme which has exceptionally high resolution adequate to provide even the fastest computers with a highly accurate timing reference that can be utilized all the way from the processor level to the global Internet level.

SUMMARY OF THE INVENTION

Accordingly, it is one object of the present invention to provide a system for synchronizing the clock cycle of a computer.

It is another object of the present invention to provide a timing mechanism utilizing a global satellite system for linking a plurality of computers in time synchronized manner.

Yet another object of the present invention is to provide a synchronized system for coordinating and synchronizing data transfer between computers through a global communications network.

Still another object of the present invention is to provide a synchronized timing system for coordinating and synchronizing data transfer between subnetworks of functionally-identified computers through a global communications network.

A further object of the present invention is to provide a massive parallel processing system using distributed interacting computers synchronized through a global communications network utilizing a system for synchronizing the clock cycle of each computer.

Yet another object of the present invention is to provide a neural network of distributed interacting computers synchronized utilizing a common timing system.

A still further object of the present invention is to provide a multi-dimensional networking protocol utilizing a synchronized timing system.

To achieve the foregoing and other objects and in accordance with the purpose of the present invention, as embodied and broadly described herein, a synchronized timing system is disclosed for one or more of a plurality of network interconnected computers. The system utilizes a global satellite system and includes a receiver device for detecting out-of-phase signals from a plurality of satellite sources of the satellite system. A mechanism is provided for processing and phase correlating these signals to generate a single absolute time reference signal therefrom. An interface device is disposed in each computer for receiving the reference signal and adapting this signal as the internal master clock reference for the operating system of the computer. Finally, a mechanism interconnects each computer in the network of computers to synchronize the internal master clocks of the computers to the absolute time reference signal to create a plurality of network interconnected time synchronized computers. These computers may be additionally time synchronized and interconnected to other networks of computers through a global communication system such as the global Internet.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE PREFERRED EMBODIMENTS

All functions of a computer are controlled by a Central Processing Unit or CPU which in turn is cycled by a master clock. The faster the master clock, the faster the computer is able to perform calculations. Moreover, data transmission is unidirectional both within a computer for its own calculations as well as intercomputer communication. In other words, information can only travel in one direction at a time. Thus, the faster and more accurate a master clock, the faster and more accurately information is communicated within a computer and between computers. When computers interact or "talk to each other" either within a small (local) or large (wide) area network or across the Internet, a computer must send out a packet of information to the host machine requesting data. The host machine then responds by transmitting the requested information. When dealing with the Internet, multiple traffic jams typically occur along the path as more than one computer attempts to contact any particular host at any one time. Such traffic is policed by the various servers in the system that store information packets in buffer zones and release them in a rotating fashion much like traffic lights store and release pools of automobiles. These "traffic jams" are the primary source of bottlenecks in the Internet accounting for its infamous and increasing slowness.

One suggested solution for the slowness of the Internet is to increase the speed and volume flow of traffic by increasing the bandwidth. However, the present invention recognizes an alternate solution to this problem. The present invention recognizes that if the master clocks of all the interacting computers could be made to be extremely accurate, i.e. down to a nanosecond, and if these extremely accurate master clocks could be synchronized, the speed and volume of information that could go through the Internet within the existing bandwidth limitation could be increased immensely. Thus, the present invention recognizes that a solution to this problem necessitates a common timing mechanism of exceptional accuracy.

Figure 1:
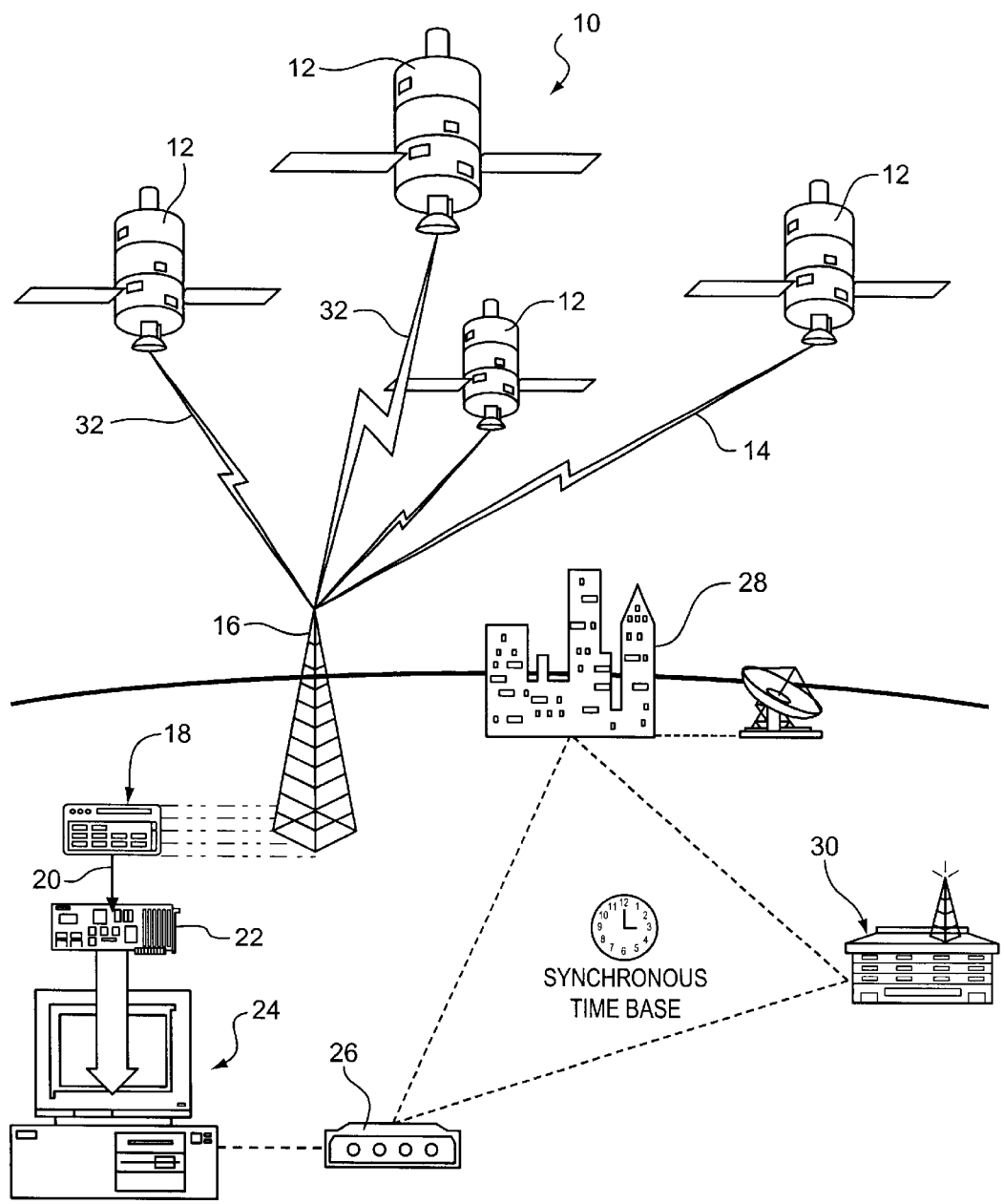
FIG. 1 is a schematic of an overview of the timing synchronization system of the present invention.
Figure 2:
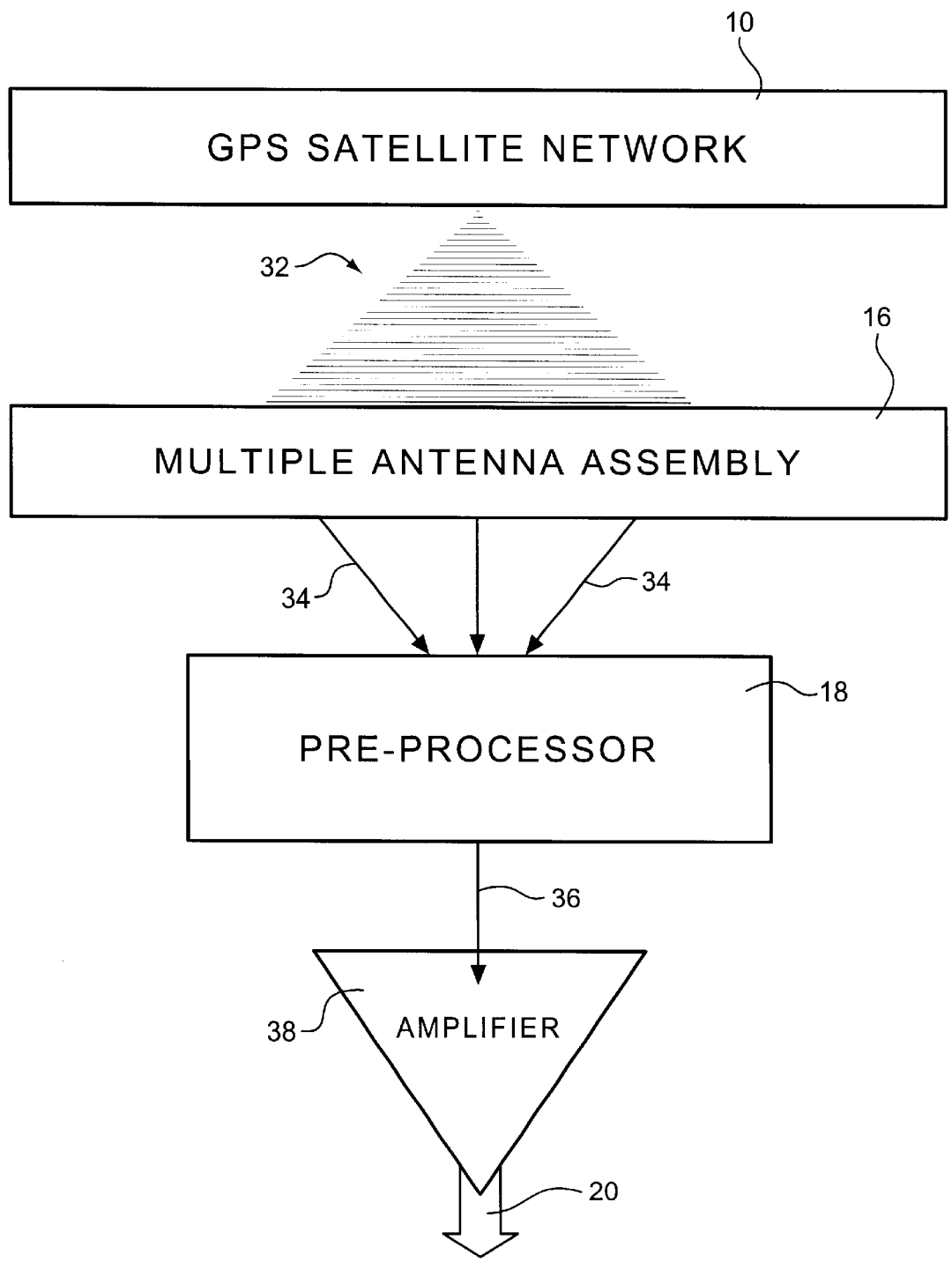
FIG. 2 is a schematic of the receiver portion of the timing synchronization system of the present invention.

Referring now to FIGS. 1 and 2, the overall synchronization system of the present invention is illustrated. It was recognized that an atomic clock has the accuracy necessary to provide timing synchronization to the level of a nanosecond. It was also recognized that the Global Positioning System (GPS) was a ready source for access to atomic clocks around the globe. U.S. Pat. No. 5,774,831, the contents of which are specifically incorporated herein by reference, discloses of the use of GPS timing signals to obtain accurate global positioning. However, to date no one has suggested the use of such timing signals as a basis for coordinating the CPU functioning of a computer as well as to synchronize the master clocks of a plurality of interacting computers.

In FIG. 1, a GPS satellite system 10 includes a plurality of GPS satellite sources 12 which emit known radio signals 14 in a repeated code pattern. While the GPS system is utilized herein as a preferred embodiment, it should be understood that any type of satellite system emitting repetitive radio signal code, or in fact any type of atomic clock source, may be utilized as an absolute time signal source in the present invention as explained in greater detail below. The signals 14 are preferably received by a multiple antenna assembly 16 and are processed by a pre-processor 18 to generate a single absolute time reference signal 20. This reference signal 20 is then directed to an interface member 22 of a computer 24. This absolute time reference signal 20 is then utilized within the computer 24 as a reference for the CPU's master clock as further described in greater detail below. The absolute time reference signal 20 may be utilized by the computer 24 to synchronize data transfer through a modem or other data transfer member 26 to interconnected computers at other locations 28 and 30, which in turn are linked to the GPS satellite system 10 in similar fashion. The subscribers at the other locations 28 and 30 may include intranet systems in a building that share a common antenna, dense city environment where an antenna or a network of antennas supply a common source for many unrelated users, and additional single users.

Figure 3:
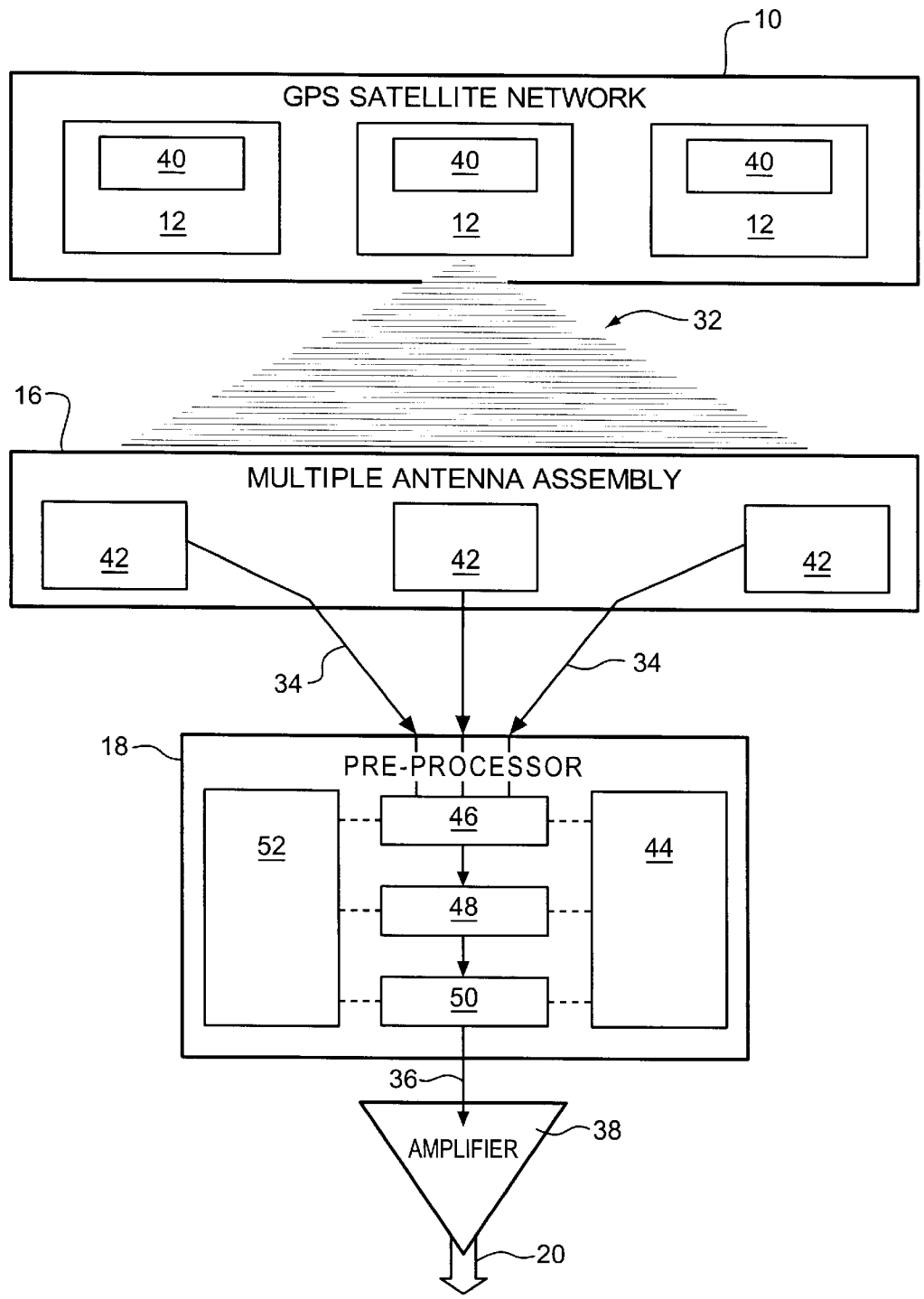
FIG. 3 is a schematic of the satellite and receiver portion of the timing synchronization system of the present invention.

Referring to FIGS. 1–3 and in preferred form, each satellite 12 of the GPS satellite network 10 transmits a reference signal 32 that is received by a multiple antenna assembly 16. The outputs 34 of each antenna 16 are fed to a pre-processor 18 which performs a comparison between the antenna outputs 34, and the corrected signal 36 is subsequently sent to an amplifier 38 for transmission in the form of the reference signal 20. In more detail, multiple atomic clocks 40 aboard each GPS satellite 12 are averaged, and a timing signal 32 is broadcast into the earth's atmosphere. A multiple antenna assembly 16 containing multiple multi-channel antennas 42 is adapted to receive the broadcast GPS signals 32. Each multi-channel antenna 42 receives a timing reference signal 32 from each of a plurality of the GPS satellites 40. As described in greater detail below, the antenna assembly 16 is constructed so that the signals 32 from only two GPS satellites 12 are needed to be received by each multi-channel antennae 42 to ultimately generate the absolute timing reference signal 20. The book entitled, "GPS: A Guide to the Next Utility" by Jeff Huron, Trimble Navigation, Ltd., Sunnyvale, Calif., 1989, the contents of which are incorporated herein by reference, clearly illustrates the overall operation of the GPS system.

The multi-channel antennas 42 are separated from each other within the antenna assembly 16 by a known distance. The output of each multi-channel antenna 42 is fed, in preferred form, to a pre-processor 18. Using an internal reference clock 44, the pre-processor 18 performs signal comparison 46, signal averaging 48 and then error correction 50 on the multi-channel signals 34 produced by each multi-channel antenna 42 within the assembly 16. This results in a singular timing signal 34 from each multi-channel antenna 42. The pre-processor 18 than performs comparison 46, averaging 48 and error correction 50 on the collection of signals from the multiple antennas 42 using the known distance of separation between the multi-channel antennas 42 within the assembly 16 to calculate an absolute time. A control processor 52 manages the functions within the pre-processor 18 and performs calculations. The output of the pre-processor 18 is an absolute timing reference 36, which is fed to the amplifier 38 for transmission and distribution as the absolute timing reference signal 20.

Figure 4:
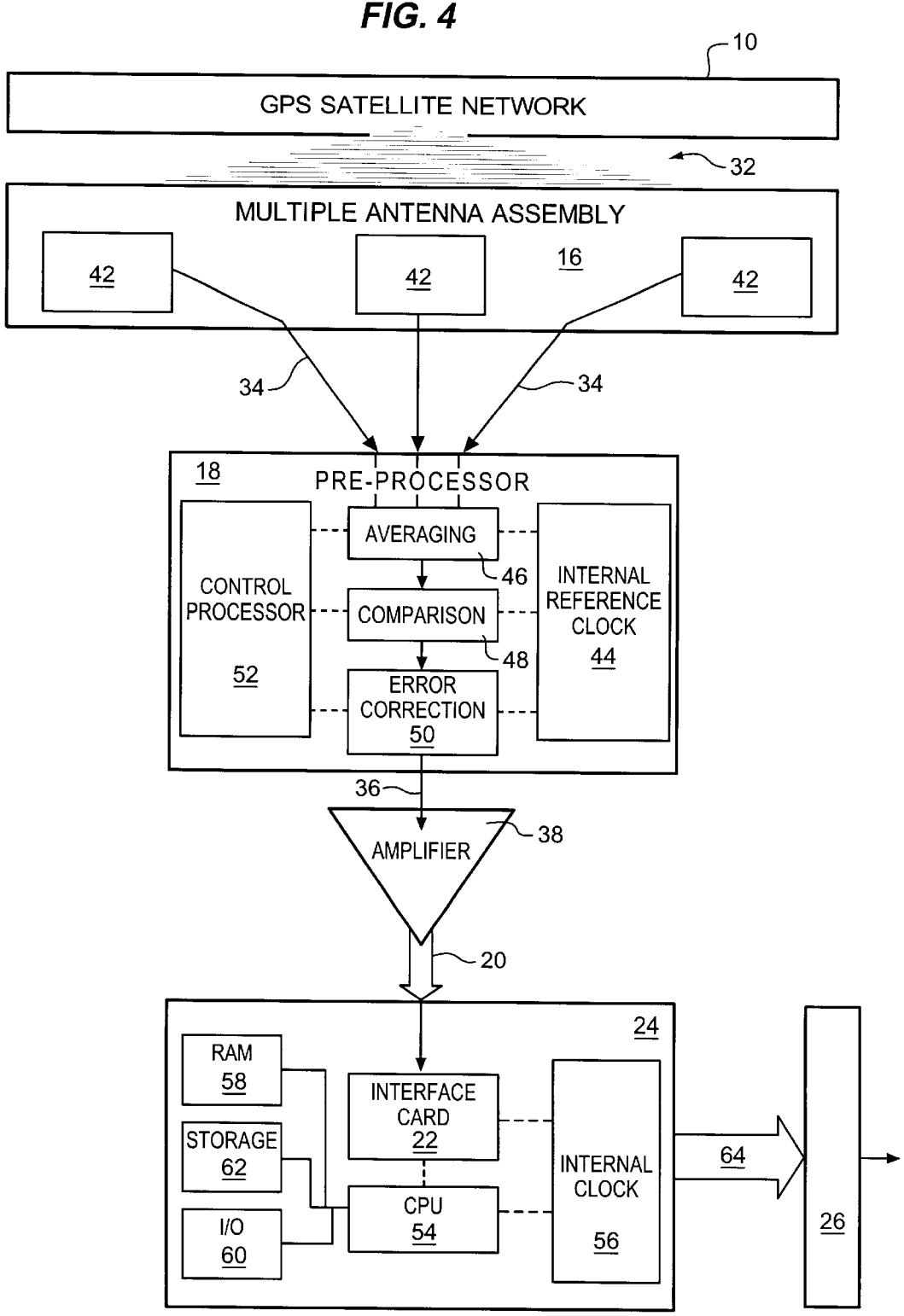
FIG. 4 is a schematic of the timing synchronization system of the present invention as it is applied to a single computer.
Figure 5:
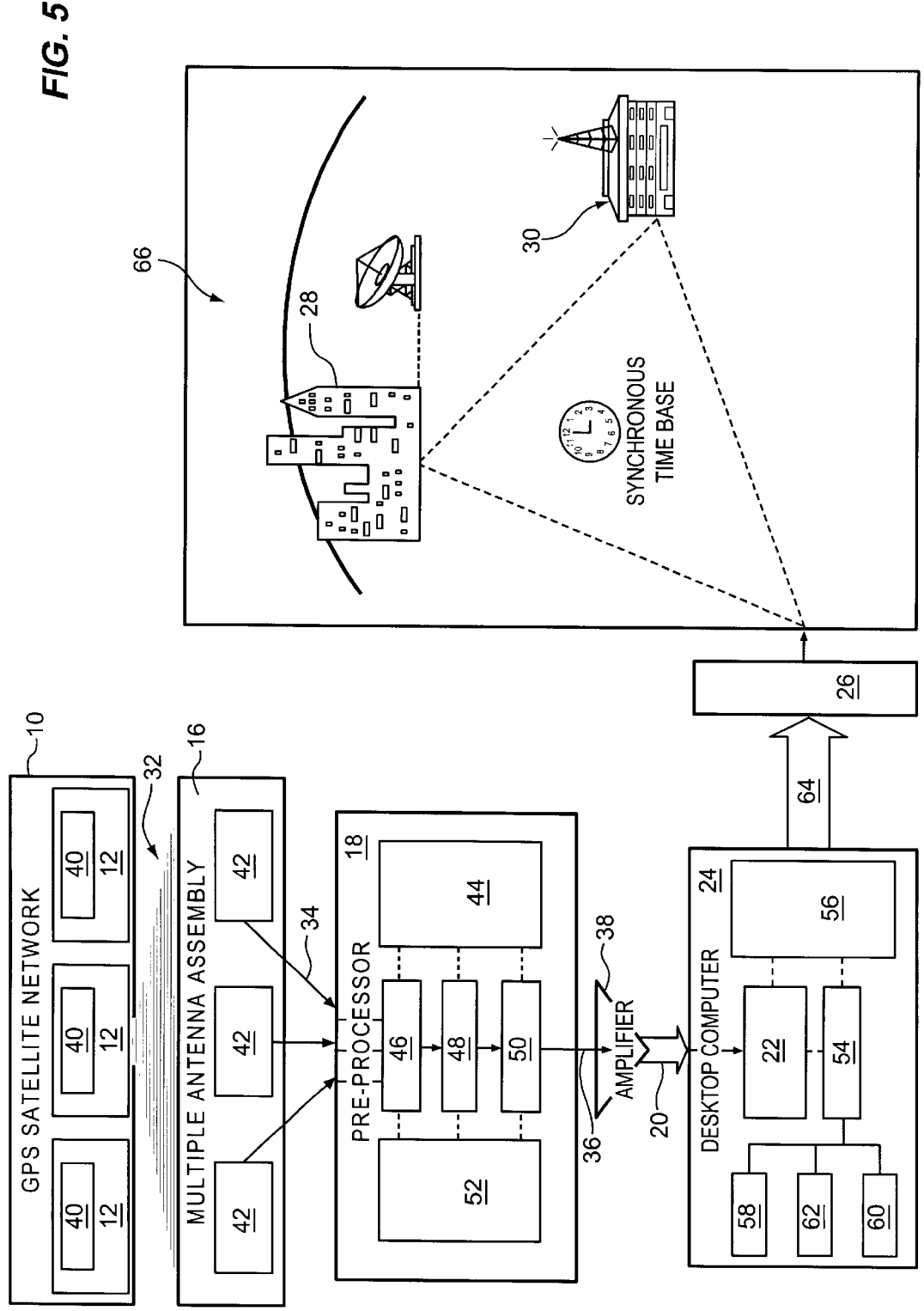
FIG. 5 is a schematic similar to that of FIG. 4 but illustrating the single computer linked to a global communication network.
Figure 6:
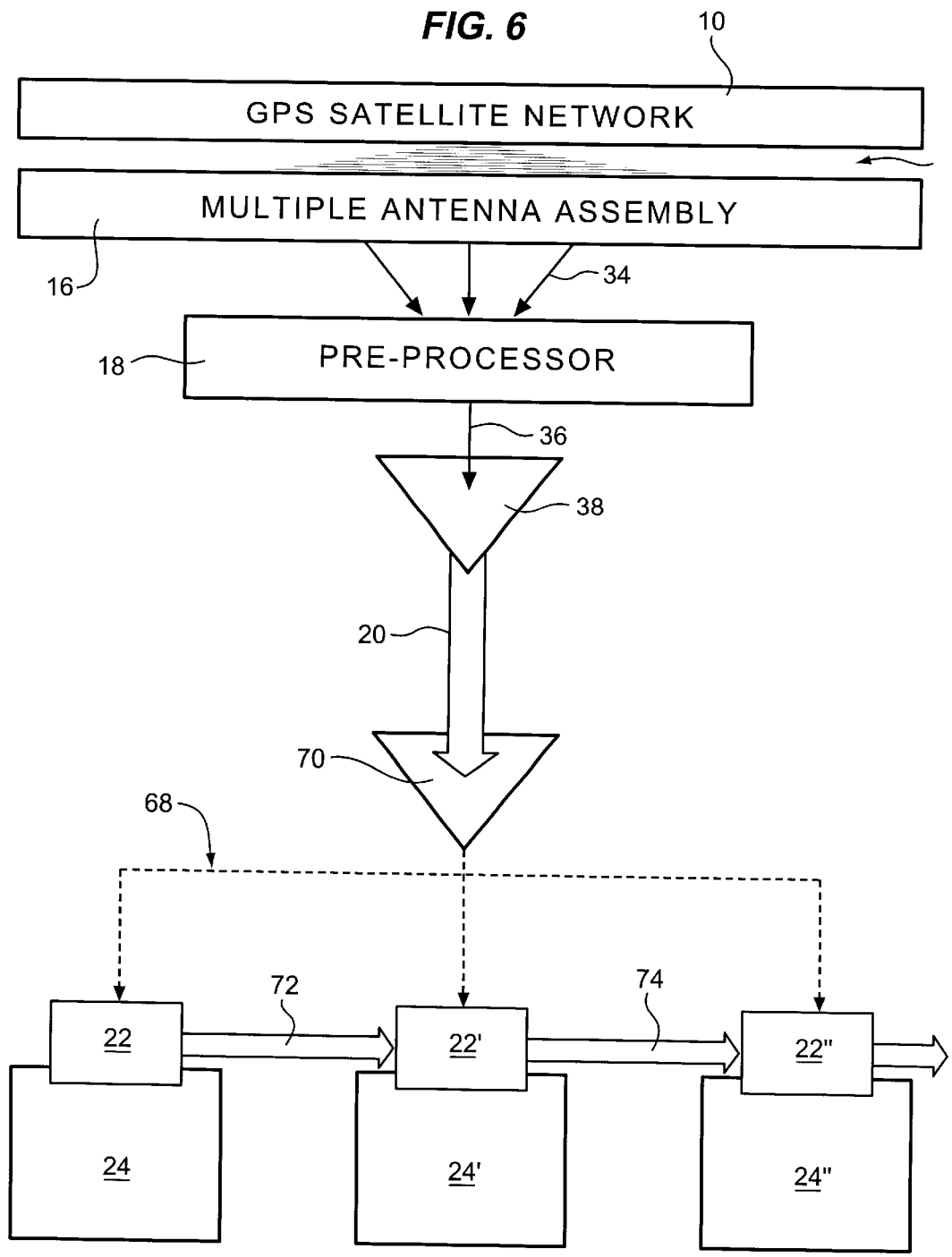
FIG. 6 is a schematic of the timing synchronization system of the present invention as it is applied to a plurality of networked computers.

Referring now to FIGS. 4–6, the amplifier 38 transmits an absolute timing reference signal 20 to a computer 24. In one form of the invention, an interface card 22 disposed within the computer 24 receives the absolute timing reference signal 20. Interaction between the interface card 22, the CPU 54, and the computer's own internal master clock 56 creates a synchronized environment that may or may not affect the CPU itself, and may or may not affect the computer's other internal processes, such as the RAM 58, the I/O 60, the storage 62, and the like. Synchronized data 64 created by the synchronized environment within the computer 24 is then passed through a high-speed communication data translator or transmitter such as a modem 26. The high-speed communication translator/interface 26 may or may not, as desired, be an integral part of the interface card 22 itself. The data transmitter 26 is then connected to other computers via a local area network, a global communications network 66, or the like.

In one form of the invention, the synchronization system may be utilized to synchronize multiple computers in an intranet 68, such as a LAN. In this embodiment, a receiver assembly including a multiple antenna assembly 16, a pre-processor 18 and an amplifier 38 produces the single timing reference signal 20. The reference signal 20 is then distributed by an amplifier 70 among multiple computers 24, 24' and 24" in the intranet 68 by way of respective interface cards 22, 22' and 22". The synchronized data flow 72 and 74 between the multiple computers 24, 24' and 24" enable these computers to interact with each other in a highly synchronized manner since each has its respective master clock 56 synchronized with the absolute timing reference signal 20. In addition, the synchronized data flow 72 and 74 may or may not then be translated by a high speed communication device such as a modem 26 to link the networked computers 24, 24' and 24" to a global communications network 66.

Figure 7:
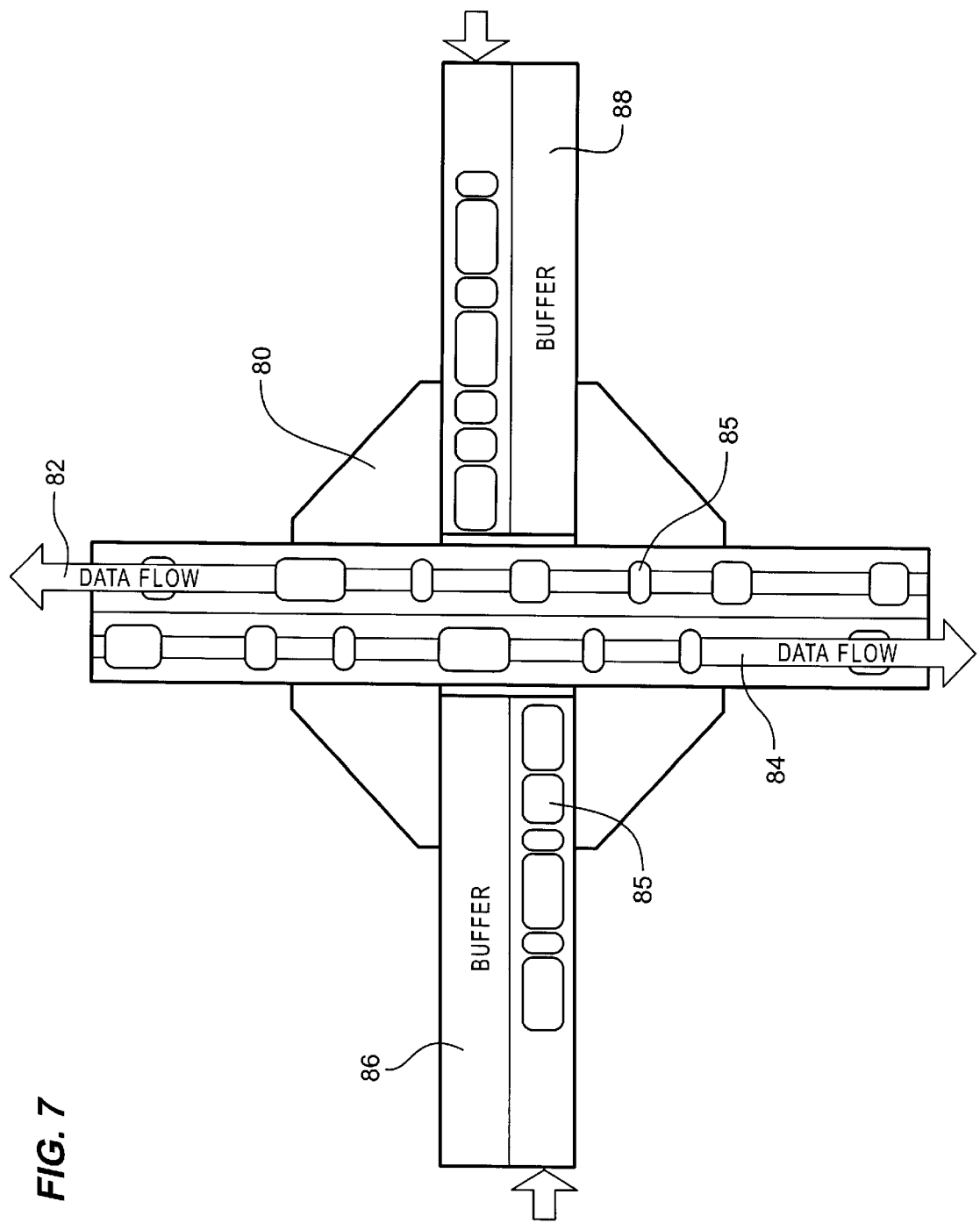
FIG. 7 is a schematic of buffered data transmission utilizing timing synchronization systems of the prior art.
Figure 8:
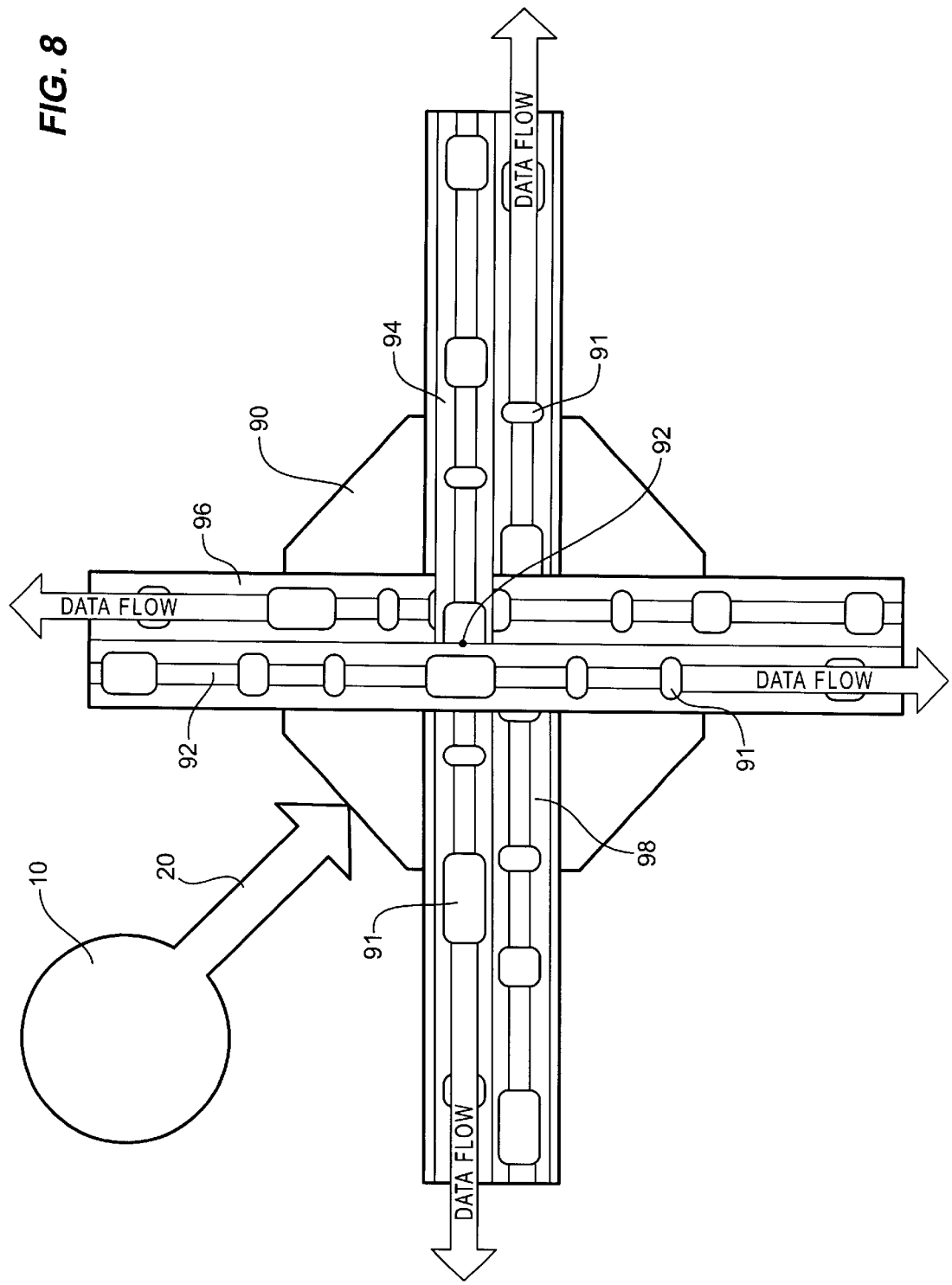
FIG. 8 is a schematic of synchronous parallel data transmission utilizing the timing synchronization system of the present invention.

Referring particularly now to FIGS. 7–10, the ability of the present invention to synchronize interacting computers is very powerful. In theory, every single computer on the global Internet could be synchronized to every other computer at the most basic computational level. FIG. 7 illustrates data flow in a preemptive buffered data switching protocol typical of the existing global Internet. In this arrangement, a data switch or server 80 includes multiple data paths, for example 82 and 84, which are rotated on a first come, first served priority. As previously explained, data transmission is unidirectional both within a computer as well as in inter-computer communication. As the data is flowing along the paths 82 and 84, late data requests are preempted in favor of the current communication activity in paths 82 and 84. Thus, the late requests, such as data packets 85, are held in temporary buffers, by way of example 86 and 88, until a window becomes available for transmission. As the data travels through many different switches or servers 80 between destinations, the cumulative lateness from repeated buffering results in slow and inconsistent data transfer through an intranet system or the global Internet, hereinafter collectively known as "the net".

Utilizing the timing synchronization system of the present invention, every computer which is time synchronized via the GPS system can be assigned a particular clock cycle for communicating on the net, locally or globally. Information requests and transmissions, then, can be rotated efficiently thereby creating a continuous flow of data. In other words, the data switch or server 90 (FIG. 8) receives the absolute timing reference signal 20 as previously described and aligns itself in time with the global network. Packets or increments 91 of data flow 92, 94, 96 and 98 are offset at the source by the sending and receiving computer's or server's own GPS system assigned clock cycle according to an established protocol. Transmission paths 92–98 can then be allowed by the server 90 simultaneously because the incoming data packets 91 along each path 92–98 are timed to miss each other. The GPS system has enough timing resolution, i.e. down to the nanosecond, to allow massive quantities of data with very small offsets to pass through the server or data switch 90 uninhibited. The net result is that any given computer 24 is able to read data from a remote server 90 or remote computer 24' almost as if it were directly connected with a hard wire. Virtually instantaneous data transfer, subject to the physical limits of the wire path in-between, is possible, thereby functionally enabling the user of a computer 24 to read and retrieve data from a remote source as if it were stored in the RAM 58 of the computer 24 itself. Using a massively synchronized paradigm, data flow is much faster and smoother, and modem speeds and transfer rates are accelerated to the physical limits of the transmission medium. At the highest level, total synchronization allows programs to be distributed over many computers for massively parallel computation as described below.

Figure 9:
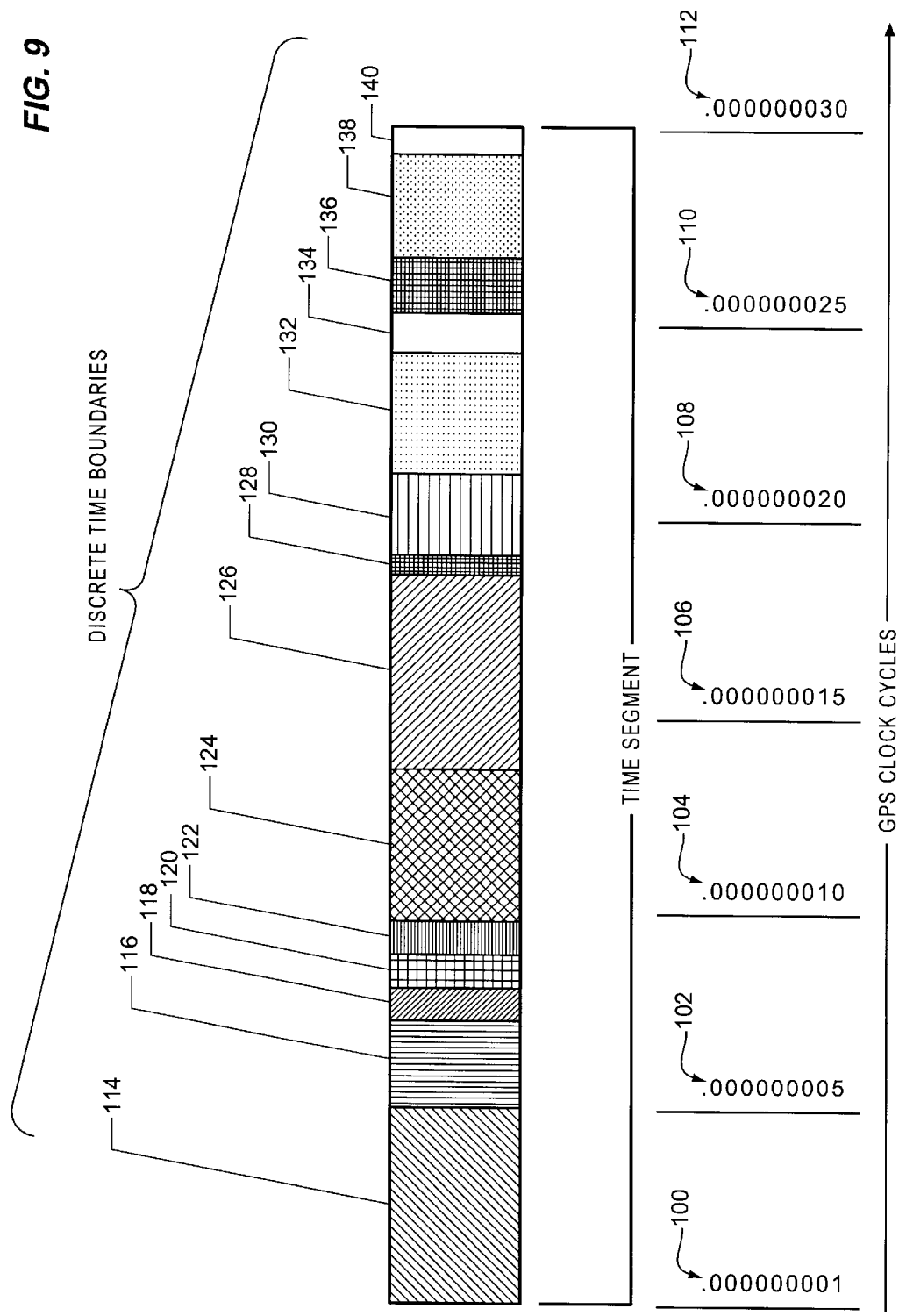
FIG. 9 is a graphical illustration showing multi-dimensional networking protocol utilized in one embodiment of the present invention.
Figure 10:
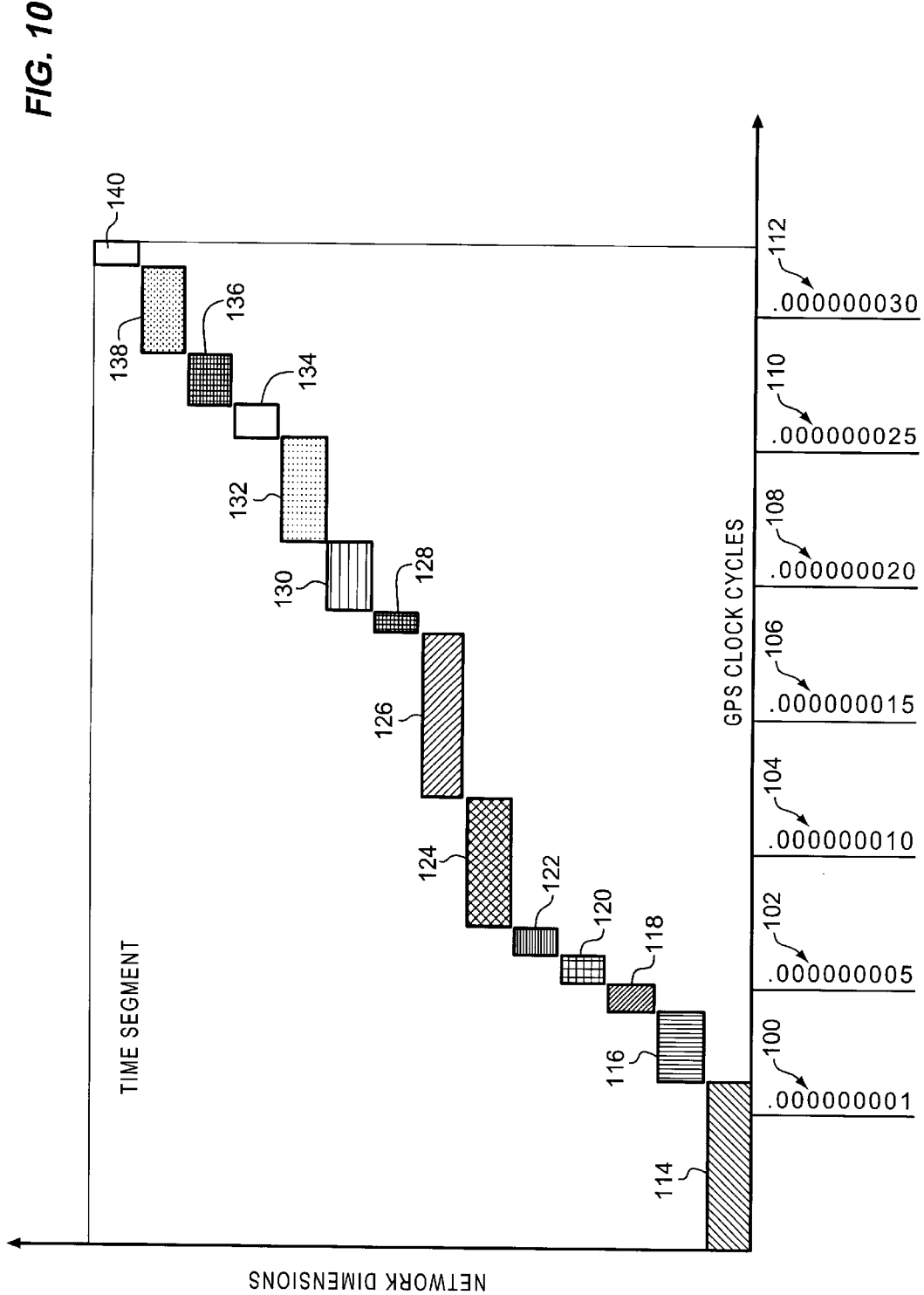
FIG. 10 is another graphical illustration showing multi-dimensional networking protocol utilized in one embodiment of the present invention.

Referring particularly, now, to FIGS. 9 and 10, the multi-dimensional networking protocol referred to above is illustrated. Units of time, or time segments 100–112, are divided into small divisions of predetermined length, i.e. discrete time boundaries. The discrete time boundaries are divided into individual zones 114–140. Each such zone is preferably assigned a particular function or address. Moreover, each time segment is allocated to a specific GPS clock cycle down to the nanosecond. For example, a zone 114 is assigned for educational use, while the zone 116 is limited to hospitals, zone 118 for government, zone 124 for entertainment, and the like. Additional zones can be allocated for specific types of data such as digital audio, digital video, graphics and the like. Because all time segments 100–112 are referenced by GPS clock cycles, any computer subscribing to the GPS protocol can jump zones simply by changing the time offset interval that it uses to access information. Like changing television channels, a GPS-based computer user can change time zones to gain access to an exclusive use Internet. The result of the present invention is greatly improved speed and transfer rates for a greater number of specialized applications as well as virtually immediate access between remote computers.

Figure 11:
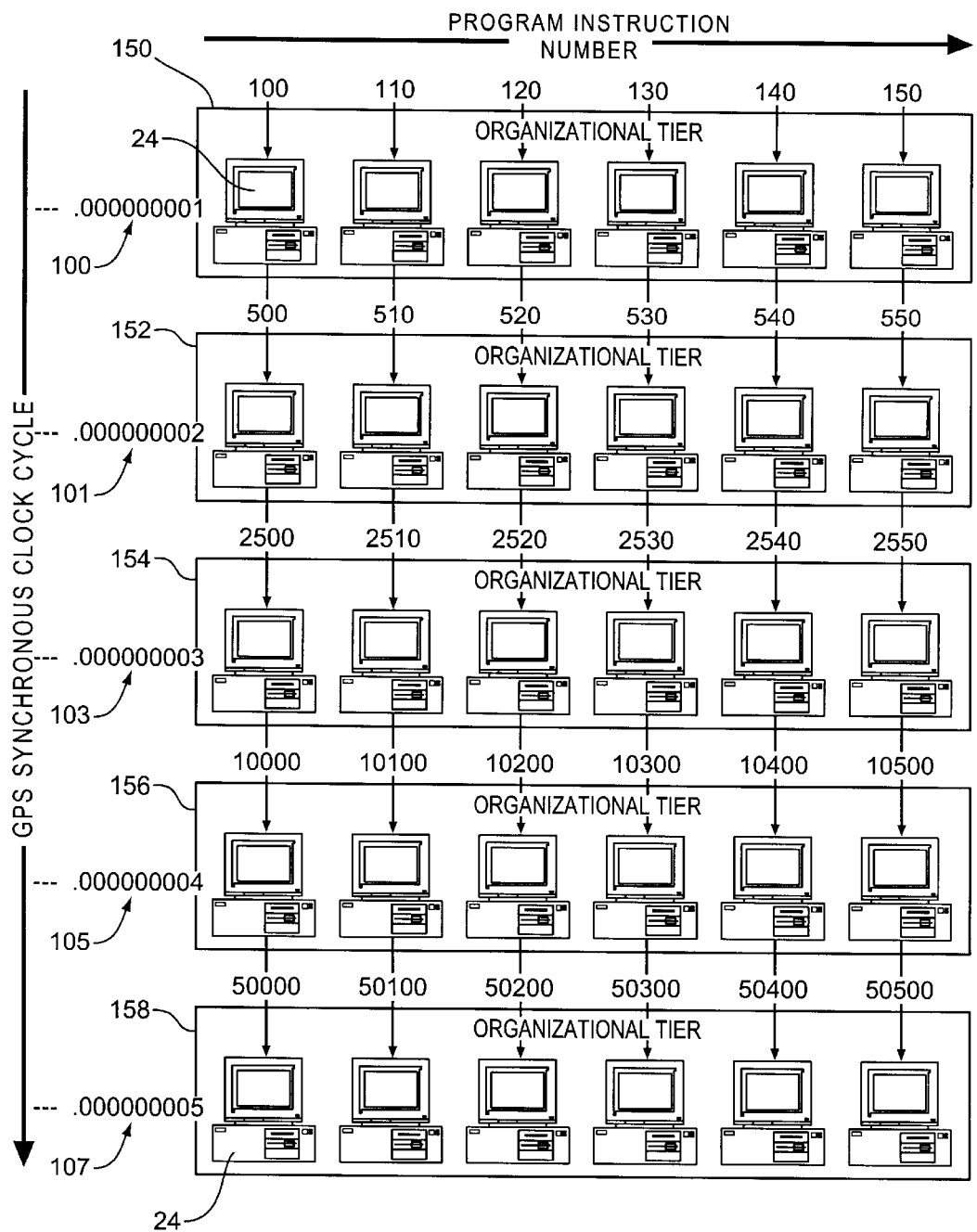
FIG. 11 is a schematic illustrating a massive parallel processing system having distributed interacting computers synchronized through a global communications network utilizing the synchronization system of the present invention.

Implementing the timing synchronization system of the present invention at its highest level, total synchronization allows programs to be distributed over many computers and servers for massively parallel computation. Such unity is capable of unlimited computations bounded or limited only by the number of computers online interacting together. FIG. 11 illustrates such a massively parallel-distributed computation steam. Utilizing the timing synchronization system of the invention with the GPS global network as described above, a massively parallel supercomputer can be simulated.

For example, a plurality of computers 24 are organized in a first tier 150 at a specific time segment 100 in the GPS clock cycle. Likewise, a plurality of computers 24 are organized in a second tier 152 at a next time cycle 101 and so on as illustrated in FIG. 11. Program instructions are then distributed between a number of pre-designated host processors or computers. Utilizing the GPS time base, the connected computers 24 execute instructions or instruction sets, outputting and inputting data at predetermined intervals of the GPS clock, i.e. the organizational tiers 150, 152, 154, 156 and 158. The size of the virtual mainframe can vary, with resources being dynamically allocated to match specific needs and tasks. If necessary, a very large number of computers 24 can execute an entire program in only a few GPS clock cycles as illustrated.

Figure 12:
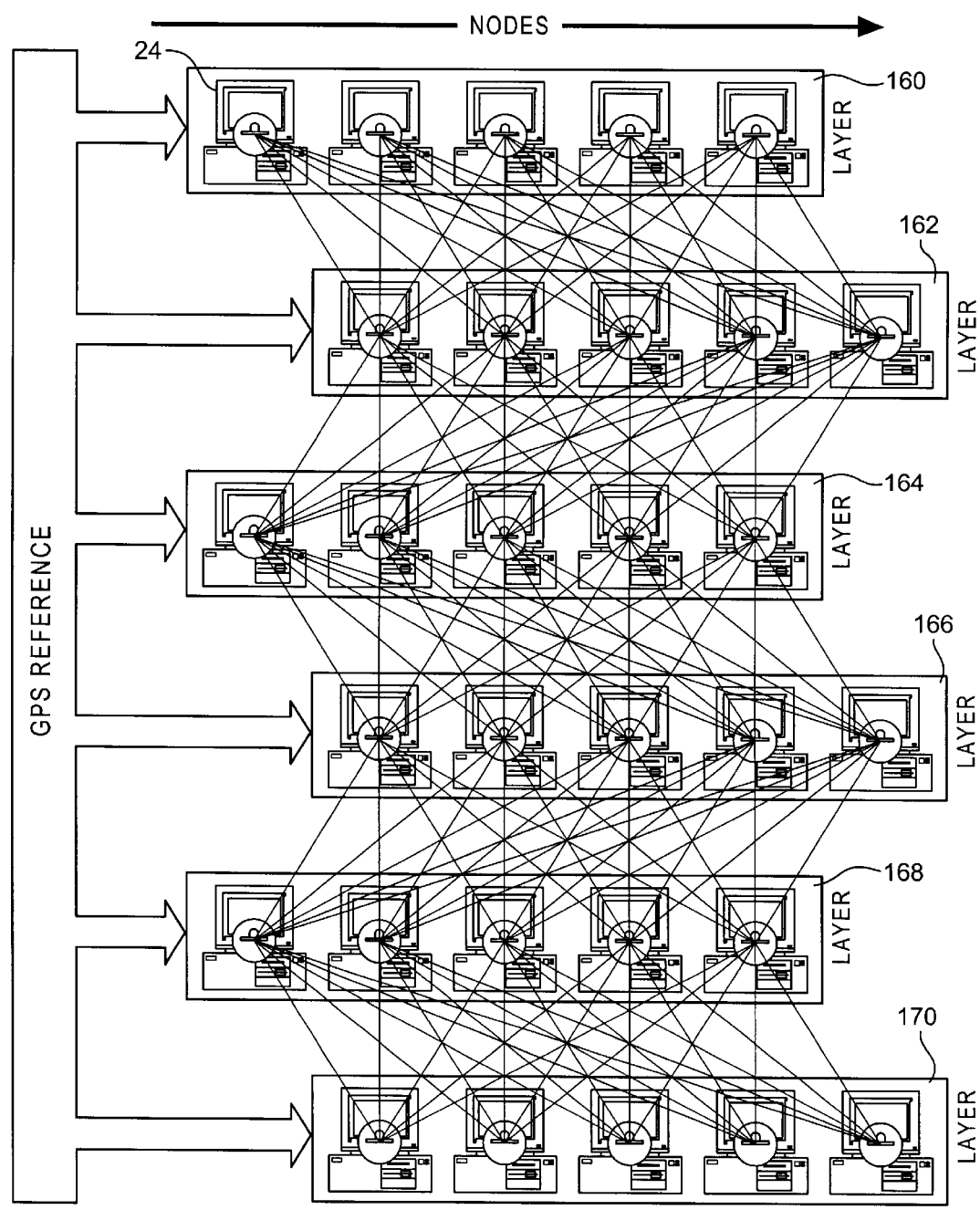
FIG. 12 is a schematic illustrating a neural network of distributed interacting computers synchronized utilizing the synchronized timing system of the present invention.
Figure 13:
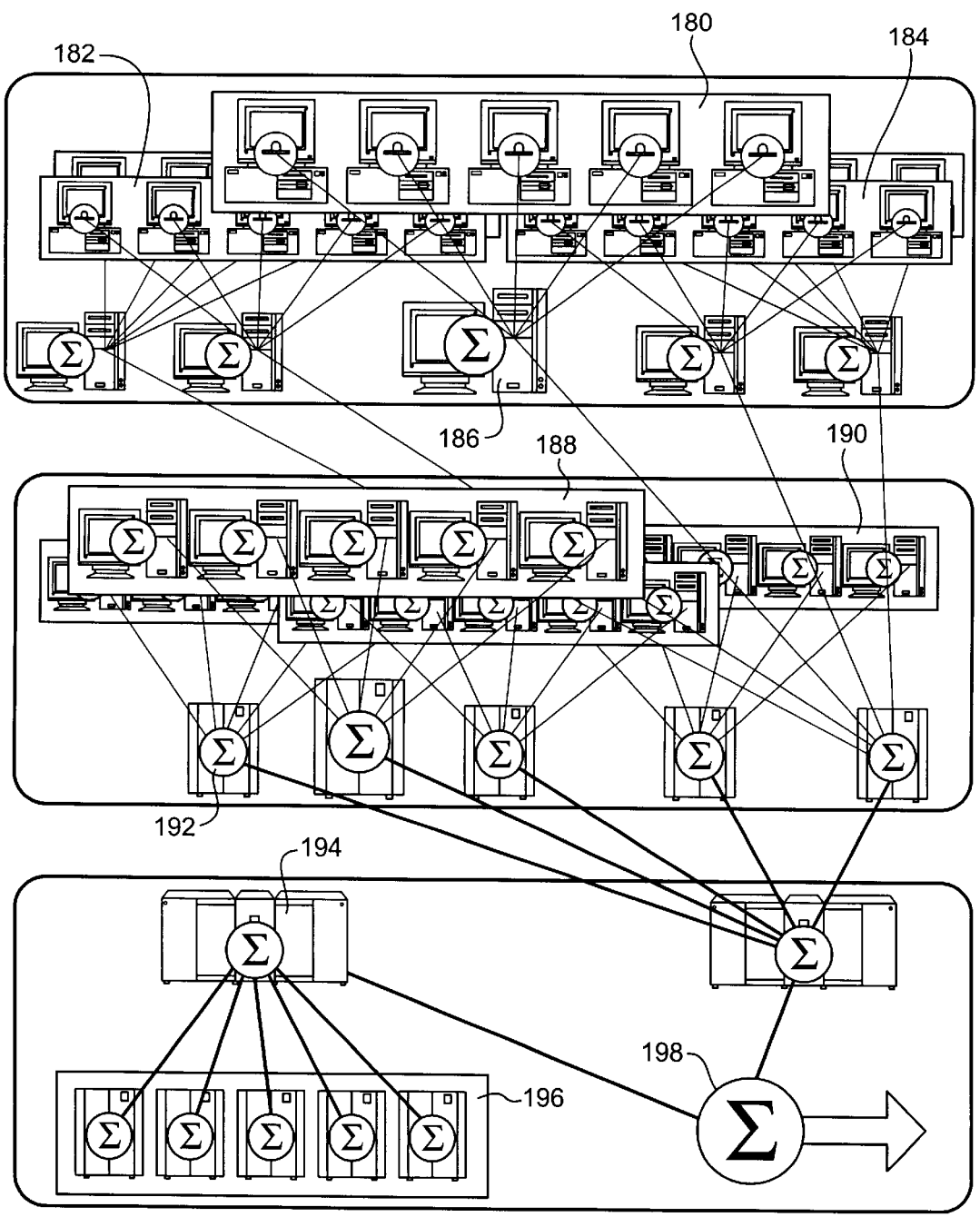
FIG. 13 is a schematic similar to that of FIG. 12 but illustrating a hierarchical neural network topology utilizing the synchronized timing system of the present invention.

Referring now to FIGS. 12 and 13, the above concept can be expanded into yet a different direction. Instead of having a plurality of computers linked in a direct, linear fashion for parallel processing as illustrated in FIG. 11, a plurality of computers can be organized as nodes in a neural network utilizing the synchronization system of the present invention. In FIG. 12, a plurality of computers 24 are arranged in a plurality of layers 160, 162, 164, 168, 170 and 172. Each computer 24 in the node layer 160 is arranged to interact with each computer in an adjacent layer 162. Likewise, each computer 24 in the node layer 162 is arranged to interact with each computer in the node layer 160 and the other adjacent layer 164, and so forth. Each connected computer 24 has an instruction set of input and output conditions and biases. Groups of computers 24 are organized into the node layers 162–172 as opposed to organizational tiers as illustrated in FIG. 11. Moreover, the node layers can be three-dimensional. Each computer 24 of each node layer 160–172 is time sequenced to the same GPS clock cycle, thereby organizing each computer of the system illustrated in FIG. 12 in the identical time synchronization system. The GPS reference creates a continuous base for all normal activity in this arrangement.

The neural network system illustrated in FIG. 13 takes this step further in the form of a hierarchy of nodes. Individual processing elements in the form of a plurality of first or elementary nodes 180, 182, 184 and 186 are connected to a plurality of second processing elements or nodes 188, 190 in the form of local servers or collector notes. These nodes are in turn connected to larger university mainframes or intermediate nodes 192, 194, which in turn are connected to a plurality of yet larger mainframes, Government or corporate output nodes 196, 198. Neural network programming collates the outputs of each first, second, third and forth layer of nodes until the final outcome, or goal, is achieved, that is the last output node 198.

Figure 14:
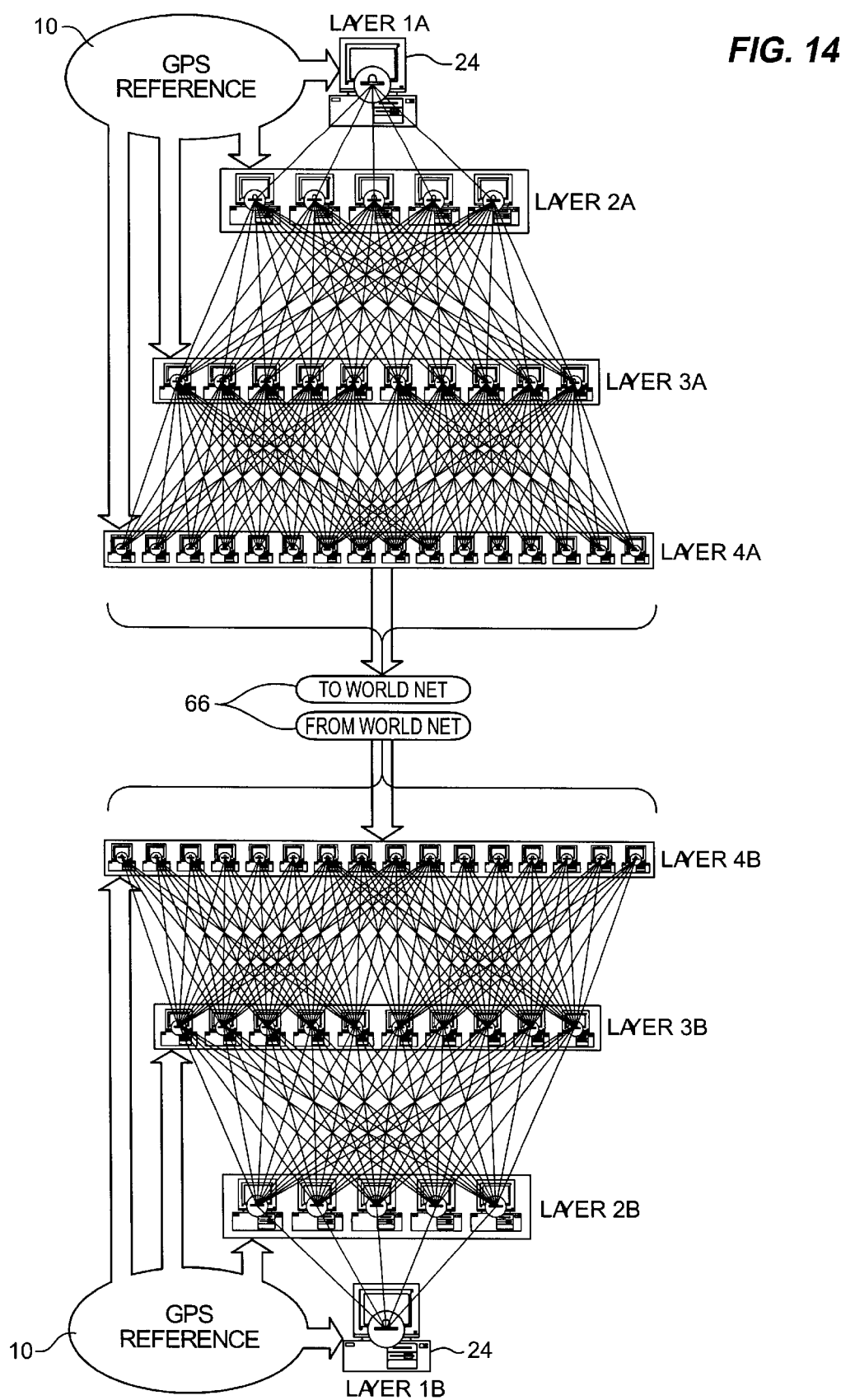
FIG. 14 is a schematic illustrating an exponential neural network topology synchronized through a global communications network and utilizing the synchronized timing system of the present invention.

Referring to FIG. 14, the above neural network arrangement is illustrated with respect to the global or world net. Starting with a single computer 24 at layer 1A, the computer 24 has its master clock synchronized to the absolute time reference signal 20 of the GPS satellite system 10. The computer 24 is then interconnected through an intranet system to a plurality of computers in the first nodal layer 2A which in turn are connected to the plurality of computers in the second nodal layer 3A. These are then connected to the plurality of computers in the third nodal layer 4A, and then finally into the global Internet. The reverse of this is illustrated from the global Internet to the layer 4B, then the layer 3B, the layer 2B and finally the layer 1B in the form of a single computer 24. All of the interacting computers illustrated in FIG. 14 are synchronized together since the master clocks of all these computers are referenced to the same absolute time reference signal 20. Because of the common reference signal between all the computers, each computer is identified with a specific time address and allocated a specific time segment based on that address, thereby allowing the data from any one computer to immediately flow to another remote computer due to the data sequencing as clearly illustrated in FIGS. 7–10.

As a previously indicated, a key component to the synchronization system of the present invention is the multiple antenna assembly 16 having a plurality of multi-channel antennas 42 which are adapted to receive and redirect the broadcast signals from the GPS satellite network 10. FIGS. 15–23 illustrate a plurality of embodiments of the multiple antenna assembly 16 useful with the synchronization system of the present invention. A key to all of the antenna arrangement embodiments illustrated herein is the fact that they are all arranged to remain in a horizontal attitude to eliminate one dimension of measurement. The book entitled, "GPS: A Guide to the Next Utility", the contents of which were previously incorporated herein by reference, clearly illustrates the advantage of this. In this manner, since the antenna systems utilized with the present invention are not intended to measure global position but rather only receive the timing signal, it is only necessary to receive the broadcast single from two satellites of a global satellite system, although more than two may be utilized.

Figure 15:
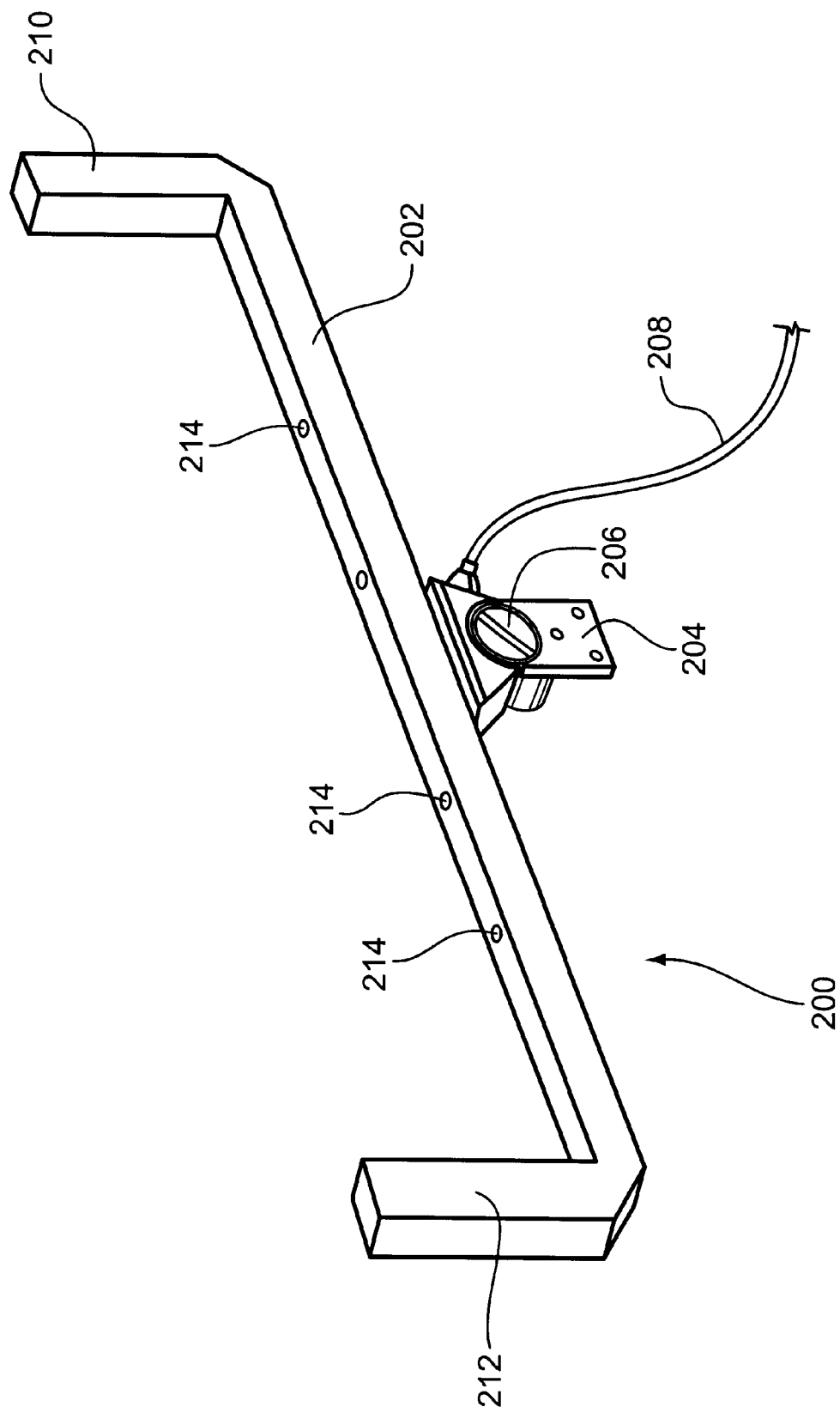
FIG. 15 is a front perspective view of a single axis, two dimensional multi-channel antennae assembly used with the synchronized timing system of the present invention.

Referring with particularity now to FIG. 15, an antenna assembly 200 is illustrated and includes a mounting arm 202 secured to a mounting bracket 204. The mounting bracket 204 includes a leveling motor 206 which is secured to a power source. An output cable 208 is provided for directing the output of the antenna 200 to a pre-processor 18. The antenna assembly 200 preferably includes a pair of multi-channel antenna receivers 210 and 212 mounted to each distal end of the mounting arm 202. Each antenna receiver 210, 212 is designed to receive the broadcast signals from a plurality of GPS satellite sources. The mounting arm 202 includes a plurality of level sensing members 214 designed to insure that the mounting arm 202 remains in a substantially horizontal attitude. The signals received by each receiver 210, 212 are correlated and then directed to the pre-processor 18 in accordance with known electronic and computer programming systems and as described above.

Figure 16:
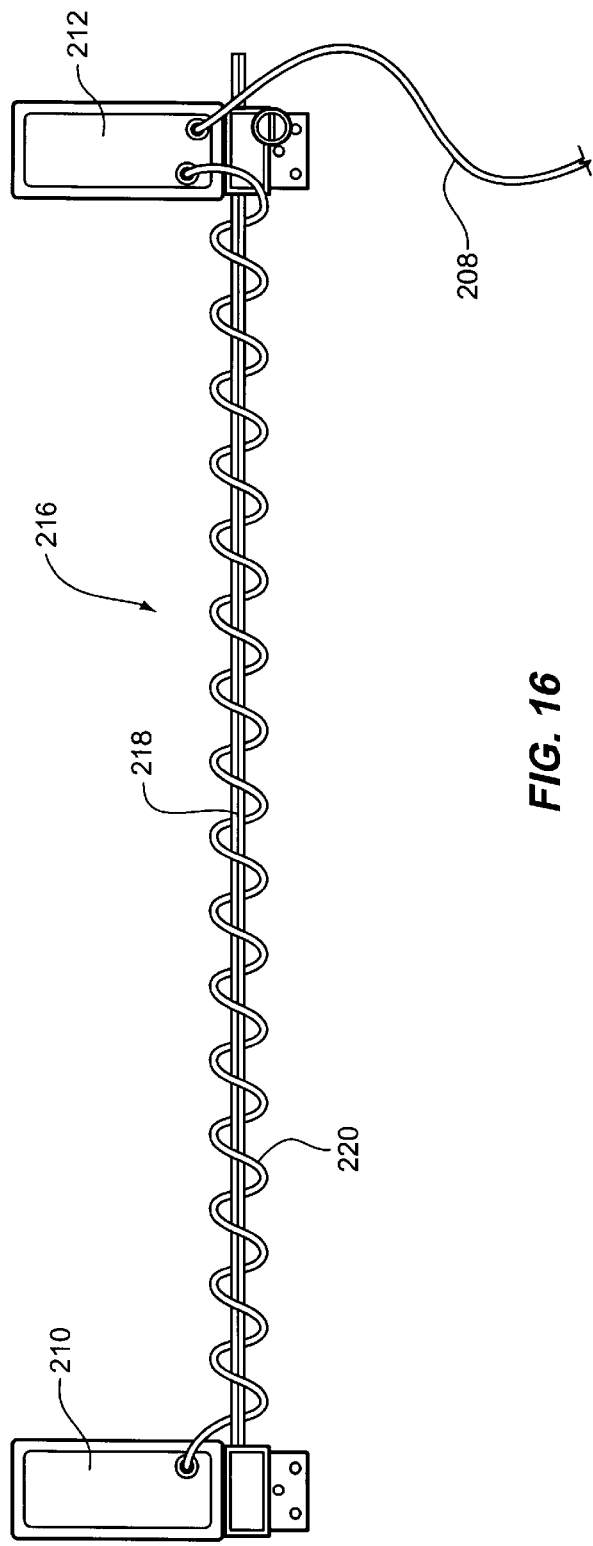
FIG. 16 is a front view of a single axis, two dimensional, multi-channel collapsible antennae assembly, in its open position, useful with the synchronized timing system of the present invention.
Figure 17:
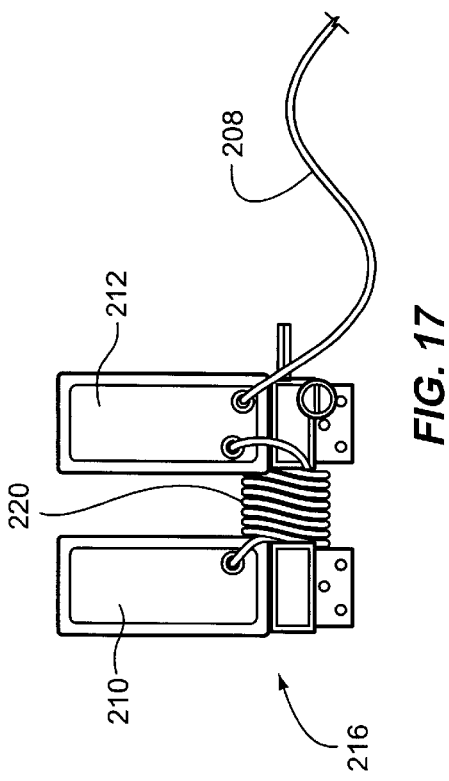
FIG. 17 is a front view of the antennae assembly illustrated in FIG. 16 but in its collapsed position.

Referring to FIGS. 16 and 17, a modification of the antenna assembly as illustrated in FIG. 15 is shown. In this instance, an antenna assembly 216 includes a mounting arm 218 removably secured to a pair of multi-channel antennas 210, 212 at each distal end thereof. The multi-channel antennas 210, 212 are electronically secured to each other by a cable 220. The mounting arm 218 can be removed so that the assembly 216 can be collapsed as illustrated in FIG. 17. The antenna assemblies 200 and 216 as illustrated in FIGS. 15–17 are single axis, two-dimensional antennas.

Figure 18:
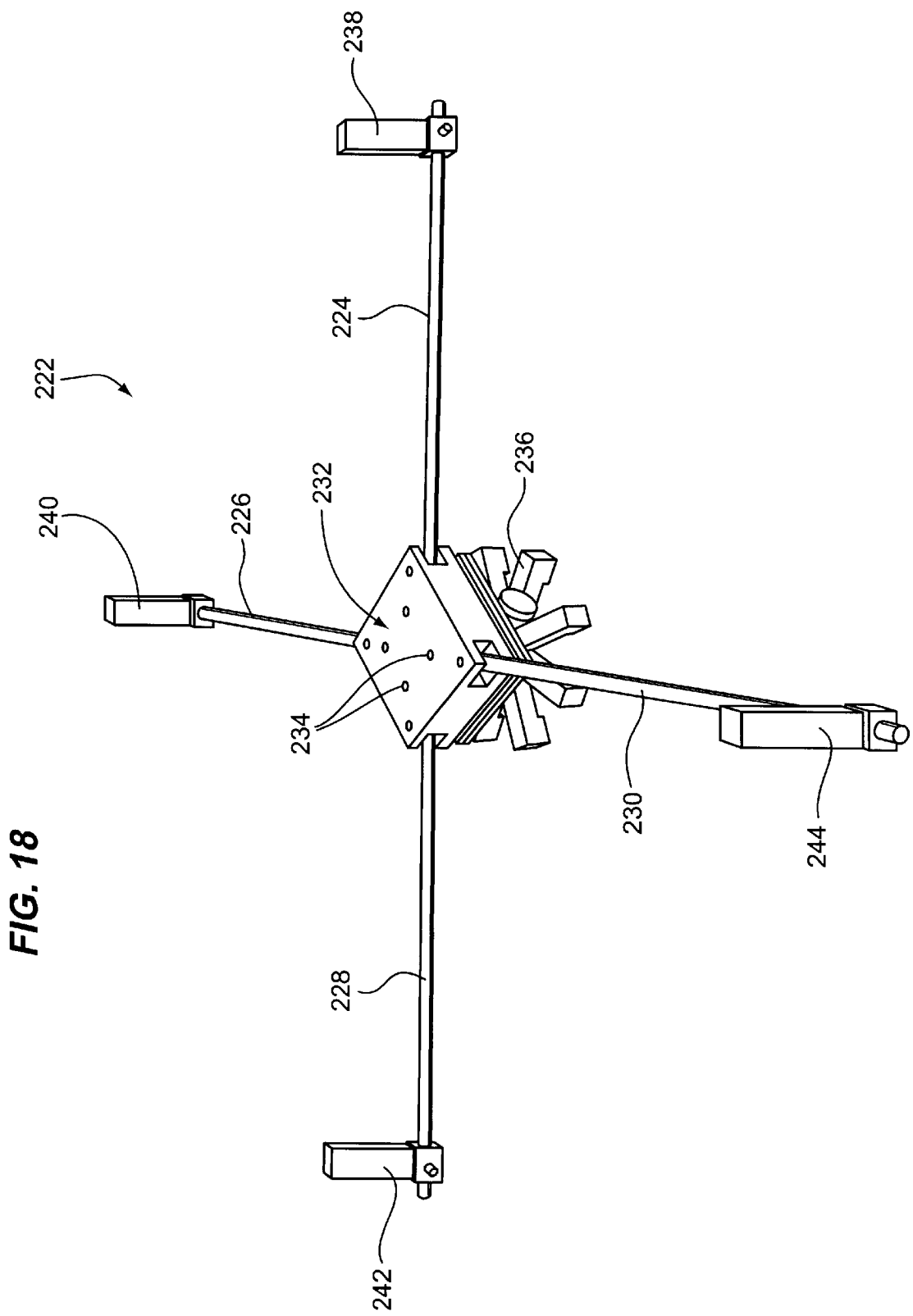
FIG. 18 is a side perspective view of a dual axis, two dimensional, multi-channel retractable antennae assembly, in its open position, useful with the synchronized timing system of the present invention.

Referring now to FIG. 18, a dual axis, two-dimensional antenna assembly 222 is illustrated. In this arrangement, the antenna assembly 222 includes four mounting arms 224, 226, 228 and 230 arranged substantially perpendicular to each other from a central attachment number or base 232. The attachment base 232 includes a plurality of level sensing members 234 to ensure that the assembly 222 remains in a substantially horizontal attitude. The base 232 is preferably mounted to a gimbal 236 to insure the horizontal attitude. The distal end of each mounting arm 224–230 includes a multi-channel antenna receiver 238, 240, 242 and 244, respectively, thereon. Again, each of the multi-channel antenna receivers 238–244 is adapted to receive a plurality of broadcast signals from a plurality of GPS satellites and to collate and rebroadcast these signals to the pre-processor 18.

Figure 19:
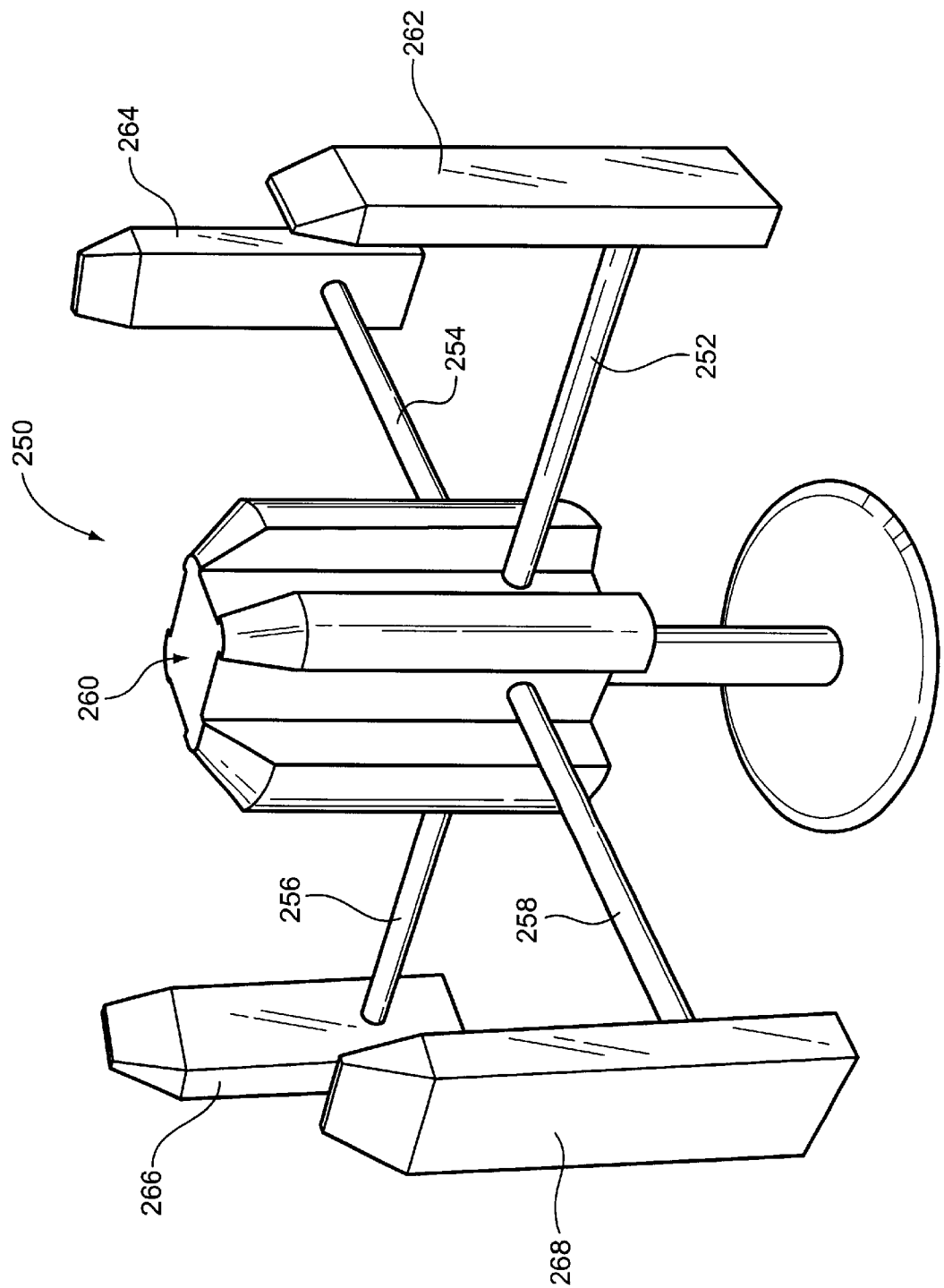
FIG. 19 is a side perspective view of a dual axis, two dimensional, multi-channel retractable antennae assembly, in its open position, similar to that illustrated in FIG. 18 but including a powered antennae retraction mechanism.
Figure 20:
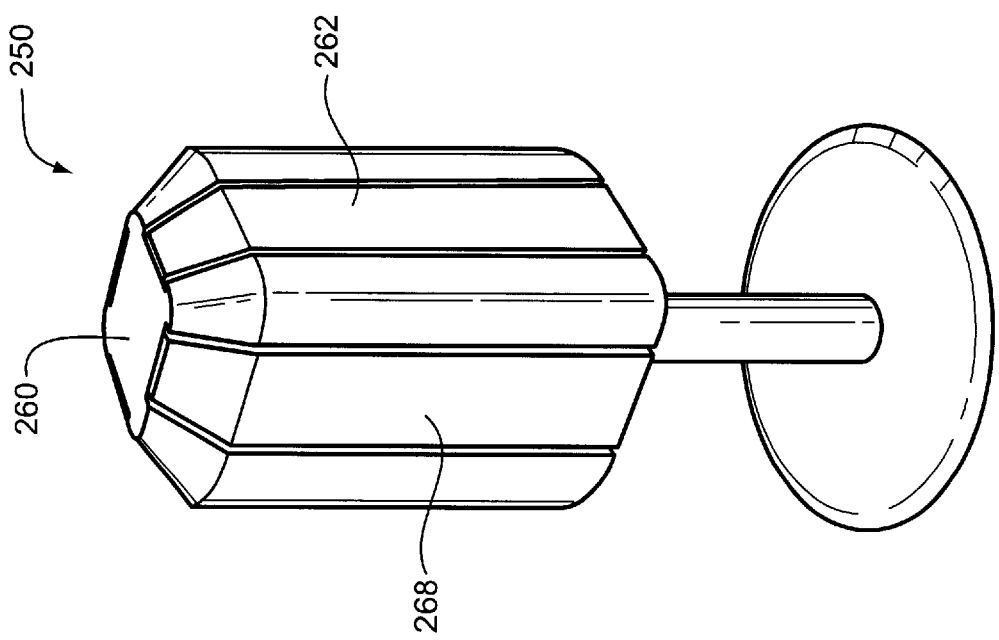
FIG. 20 is a side perspective view of the antennae assembly illustrated in FIG. 19 but in its fully retracted position.

Likewise, FIGS. 19–20 illustrate an antenna assembly 250 similar to that illustrated in FIG. 18. In this instance, the assembly 250 includes four mounting arms 252, 254, 256 and 258 secured to an automatic base assembly 260. The mounting arms 252–258 are retractable into the head 260 as illustrated FIG. 20. Each distal end of the mounting arms 252–258 includes a multi-channel antenna receiver 262, 264, 266 and 268, respectively. The antenna assembly 260 operates a manner similar to the antenna assembly to 222 to FIG. 18.

Figure 21:
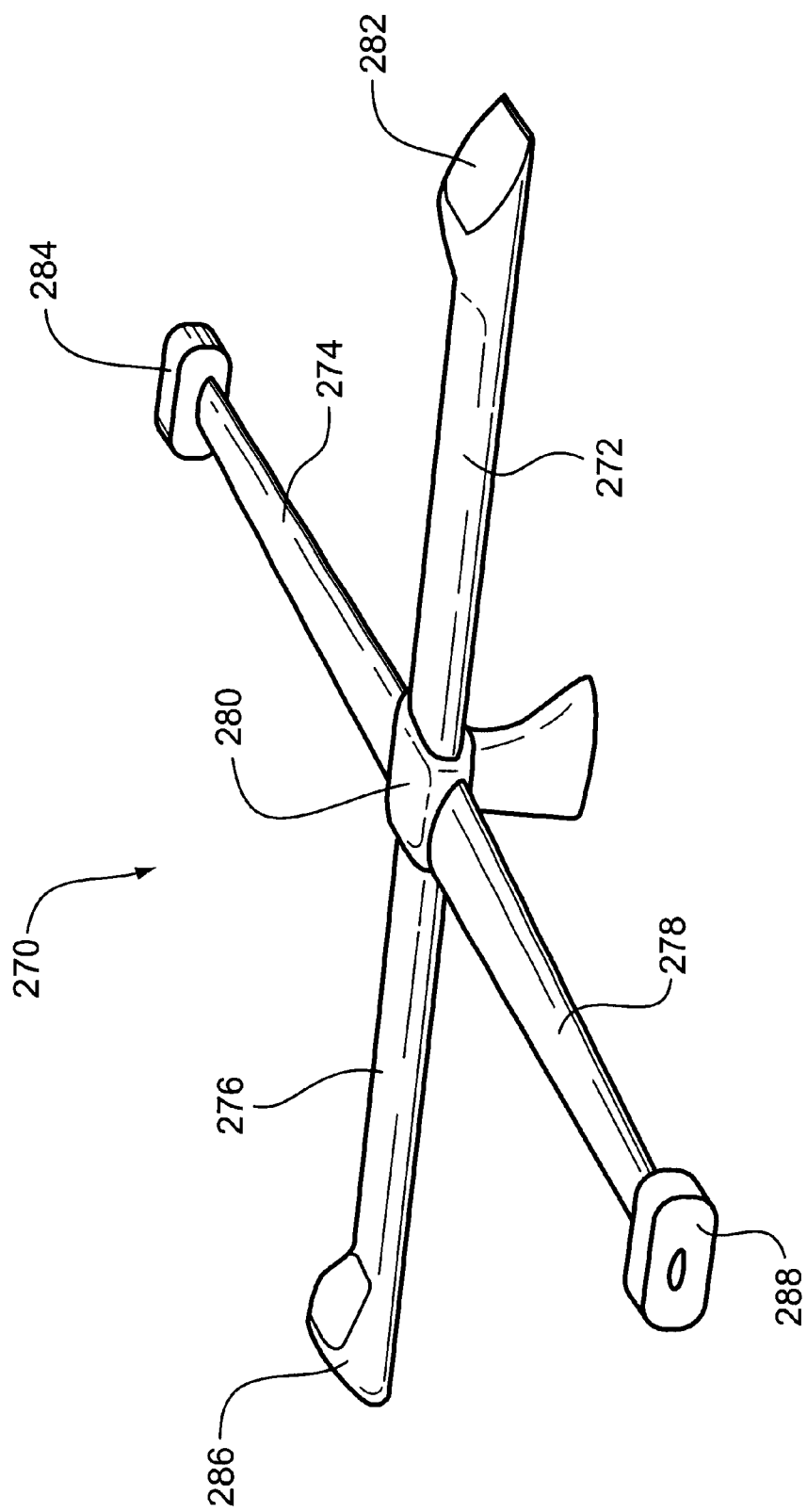
FIG. 21 is a side perspective view of a gimbal mounted, auto-stabilizing, multi-axis and multi-channel antennae assembly useful with the synchronized timing system of the present invention.
Figure 22:
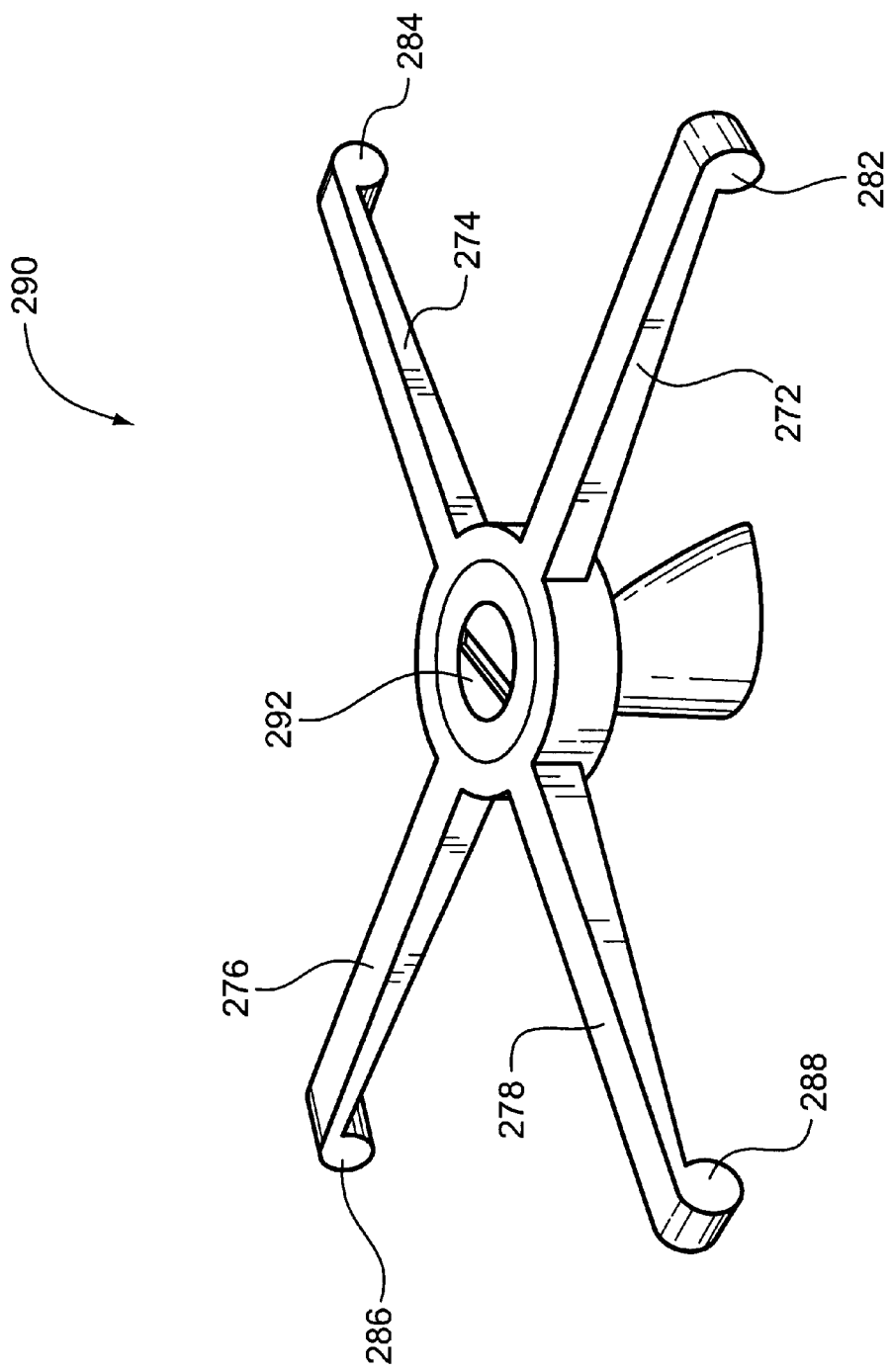
FIG. 22 is a side perspective view of another embodiment of a gimbal mounted, auto-stabilizing, multi-axis and multi-channel antennae assembly useful with the synchronized timing system of the present invention.

FIGS. 21 and 22 disclose additional embodiments of the antenna assembly of the present invention. The antenna assembly 270 includes four mounting arms 272, 274, 276 and 278 substantially perpendicular to each other and mounted to a gimbal base 280. The distal ends of the mounting arms 272–278 include multi-channel antenna receivers 282, 284, 286 and 288, respectively. It should be noted that in this particular embodiment, the multi-channel antenna receivers 282–288 preferably include gyroscopes and are enclosed in an all weather, aerodynamic housing for mobile applications. The antenna assembly 290 illustrated in FIG. 22 is similar to that of the assembly 270 of FIG. 21 except that the gimbal base 292 includes a flywheel hub 294 to help maintain the horizontal attitude of the assembly 290. The remaining components of this embodiment remain the same as in FIG. 21.

Figure 23:
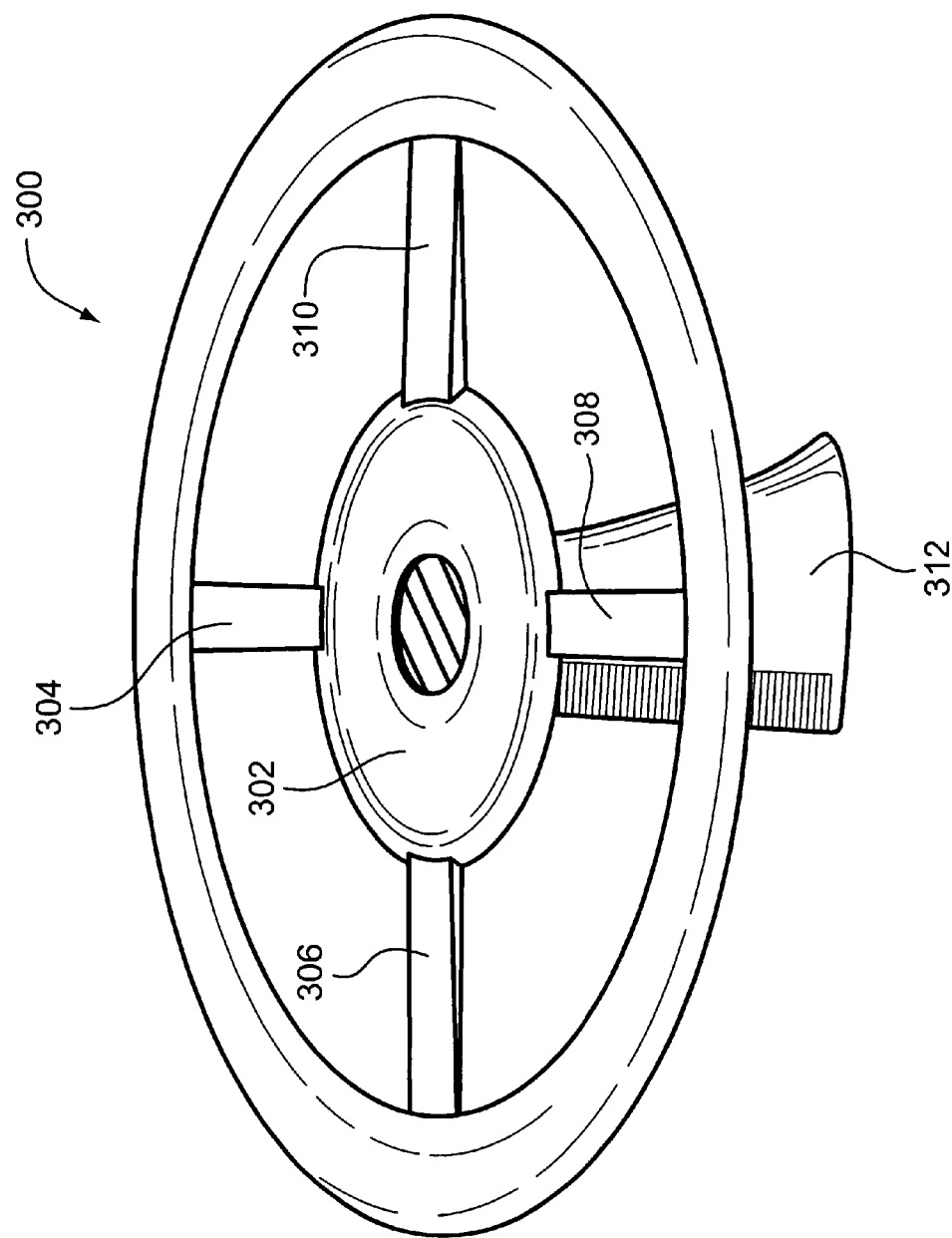
FIG. 23 is a side perspective view of yet another embodiment of a gimbal mounted, auto-stabilizing, multi-axis and multi-channel antennae assembly useful with the synchronized timing system of the present invention.

Finally, FIG. 23 illustrates yet another embodiment of the antenna assembly of the present invention. In this embodiment, the antenna assembly is in the form of an antenna ring 300 which is secured to a central hub 302 by a plurality of arm supports 304, 306, 308 and 310. The multi-channel antenna receivers are mounted within the antenna ring 300, and the central hub 302 is maintained in position by a mounting base 312.

As can be seen from the above, the present invention provides a unique synchronized timing system which enables a computer to be synchronized to the accuracy of an atomic clock. This enables any computer to interact with any other computer which is synchronized in the same system virtually instantaneously regardless of the physical or geographical location of the computers. Moreover, since each computer has its own unique time address relative to all other computers synchronized to the same protocol, each computer has instant access to any other computer node in the global Internet. Not only does this eliminate the terrible time delays presently encountered when using the global Internet, but it enables all computers to be utilized as part of a massive parallel distributed computation system as well as in a distributed neural network. Since the timing resolution of computers in such a system are accurate to at least a nanosecond, every single computer on the globe can be synchronized to every other computer at the most basic computation level. This enables the development of a massive parallel supercomputer or a virtual mainframe since each computer which is a part of this protocol can be utilized together in a wide variety of manners.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

What is claimed is:

1. A system for synchronizing the clock cycle of a computer using output timing signals from a global satellite system, said synchronizing system comprising:
   means for receiving uncorrected output signals from at least two satellites of the satellite system;
   means for processing and correlating said uncorrected satellite signals and outputting a single corrected absolute time reference signal;
   linking means for directing said reference signal to said computer;
   means disposed in each said computer for receiving said absolute time reference signal; and
   means for utilizing said absolute time reference signal as an internal reference master clock to create a discrete clock cycle for said computer referenced to said single absolute time reference signal.

2. The synchronization system as claimed in claim 1, wherein said synchronization system further includes network means for interconnecting a plurality of said synchronized computers to synchronize the internal master clocks of all said computers to said single absolute time reference signal.

3. The synchronization system as claimed in claim 2, wherein said plurality of computers comprise a first network of computers, and wherein said synchronization system includes a plurality of said networks of computers interconnected by data transmission means, all said computers of said plurality of networks of computers being synchronized to said absolute time reference signal.

4. The synchronization system as claimed in claim 1, wherein each said computer is linked to a global communications system and synchronized with each other by said absolute timing reference signal.

5. The synchronization system as claimed in claim 4, wherein each said computer includes means for transmitting data to all other computers linked thereto in synchronized form utilizing said absolute time reference signal.

6. The synchronization system as claimed in claim 5, wherein each said computer has its own discrete clock cycle referenced to said single absolute time reference signal.

7. The synchronization system as claimed in claim 1, wherein said receiving means comprises a multiple antennae assembly containing multi-channel antennae for receiving said satellite signals.

8. The synchronization system as claimed in claim 7, wherein each said multi-channel antennae includes means for receiving a time reference signal from said multiple satellite signals, said satellite system comprising the global positioning satellite (GPS) system.

9. The synchronization system as claimed in claim 7, wherein said processing means comprises a pre-processor assembly adapted to perform data comparison, averaging and error correction to the signals produced by each multi-channel antennae within said antennae assembly and to output said absolute time reference signal, and amplifier means for transmitting said absolute time reference signal to said computers.

10. A synchronized timing system utilizing a global satellite system for linking a network of a plurality of network interconnected computers with each other, said system comprising:
    receiver means for detecting out-of-phase signals from a plurality of satellite sources of the satellite system including means for processing and phase correlating said signals to generate a single absolute time reference signal therefrom;
    interface means disposed in each said computer for receiving said reference signal;
    means disposed in each said computer for adapting said signal as the internal master clock reference for the operating system of said computer; and
    means interconnecting said computers in the network of computers to synchronize the internal master clocks of said computers to said absolute time reference signal to create a plurality of network interconnected time synchronized computers.

11. The system as claimed in claim 10, wherein said receiver means comprises an antennae assembly containing spaced multi-channel antennae for receiving out-of-phase signals from a plurality of said satellite sources, said multi-channel antennae being spaced a known distance from each other, and wherein said processing means comprises a processor assembly adapted to perform signal differential correction between the signals detected at the spaced multi-channel antennae within said antennae assembly and to output said absolute time reference signal, and amplifier means for transmitting said absolute time reference signal to said interface means of each computer.

12. The system as claimed in claim 10, wherein said plurality of network interconnected computers comprises an intranet of computers, and wherein said synchronizing interconnection means comprise local area network connection members interconnecting said interface means of said computers with each other and with said receiver means.

13. The system as claimed in claim 10, wherein said plurality of computers comprise a network of interconnected time synchronized computers, and wherein each said computer in said network has its own discrete clock cycle referenced to said absolute time reference signal.

14. The system as claimed in claim 13, wherein said plurality of computers comprise a plurality of said networks of computers in a distributed system linked together by a global communications system, each individual computer including data transmission means timed by said clock cycle to permit uninhibited non-buffered data access to any other said linked computer.

15. The system as claimed in claim 14, wherein said global communication network comprises the global internet.

16. A synchronized timing system utilizing a global satellite system to link a plurality of network interconnected computers with each other through a global communications network, said system comprising:
    receiver means for detecting out-of-phase signals from a plurality of satellite sources of the satellite system including means for processing and phase correlating said signals to generate a single absolute time reference signal therefrom;
    interface means disposed in each said computer for receiving said reference signal;
    means disposed in each said computer for adapting said signal as the internal master clock reference for the operating system of said computer so that each said computer has its own discrete clock cycle referenced to said absolute time reference signal;
    means interconnecting said computers in a network to synchronize the internal master clocks of said network interconnected computers to said absolute time reference signal; and
    means interconnecting said plurality of networks of computers in a distributed system linked together by the global communications network, each said individual computer including means timed by said clock cycle to permit uninhibited non-buffered data access to any other computer linked through said global communications network.

17. The synchronized timing system as claimed in claim 16, wherein a plurality of said networks of computers are interconnected by a neural network.

18. The system as claimed in claim 16, wherein said receiver means comprises an antennae assembly containing spaced multi-channel antennae for receiving out-of-phase signals from a plurality of said satellite sources, said multi-channel antennae being spaced a known distance from each other, and wherein said processing means comprises a processor assembly adapted to perform signal differential correction between the signals detected at the spaced multi-channel antennae within said antennae assembly and to output said absolute time reference signal, and amplifier means for transmitting said absolute time reference signal to said interface means of each computer.

19. The system as claimed in claim 16, wherein said plurality of network interconnected computers comprises an intranet of computers, and wherein said synchronizing interconnection means comprise local area network connection members interconnecting said interface means of said computers with each other and with said receiver means.

20. A synchronization system for coordinating and synchronizing data transfer between computers through a global communications network, said timing system comprising:
a common timing reference for generating a single absolute time reference signal;
interface means disposed in each said computer for receiving said reference signal;
means disposed in each said computer for adapting said signal as an internal master clock for the operating system of said computer, each said computer having its own discrete clock cycle referenced to said absolute time reference signal and which comprises a time segment representing a specific unit of time which is assigned to a specific computer address; and
means linking said computers to each other through a global communications network and timed by said computer clock cycles to synchronize the internal master clocks of said computers to identify said computer by said specific computer address in the global communications network to permit uninhibited non-buffered data access between any said linked computers.

21. The synchronized timing system as claimed in claim 20, wherein said common timing reference for generating a single absolute time reference signal comprises a global satellite system.

22. The synchronized timing system as claimed in claim 21, wherein said system further comprises means for detecting uncorrected output signals from at least two satellites of said satellite system; and means for processing and correlating said uncorrected satellite signals to generate said single absolute time reference signal.

23. A synchronized timing system for coordinating and synchronizing data transfer between functionally-identified computer subnetworks through a global communications network, said timing system comprising:
a common timing reference for generating a single absolute time reference signal;
interface means disposed in each said computer for receiving said reference signal;
means disposed in each said computer for adapting said signal as an internal master clock for the operating system of said computer, each said computer having its own discrete clock cycle referenced to said absolute time reference signal which comprises a time segment representing a specific unit of time within a specific block of time which unit is assigned to a specific computer address and which block of time is assigned to a specific function subnetwork; and
means linking said computers of each said subnetwork to each other through the global communications network and timed by said computer clock cycles to synchronize the internal master clocks of said computers to identify said computer within each said functional subnetwork by said specific computer address in the global communications network to permit uninhibited non-buffered data access between any said linked computers of a subnetwork.

24. The synchronized timing system as claimed in claim 23, wherein said common timing reference for generating a single absolute time reference signal comprises a global satellite system.

25. The synchronized timing system as claimed in claim 24, wherein said system further comprises means for detecting uncorrected output signals from at least two satellites of said satellite system; and means for processing and correlating said uncorrected satellite signals to generate said single absolute time reference signal.

26. A massive parallel processing system utilizing distributed interacting computers synchronized through a global communications network utilizing a system for synchronizing the clock cycle of each computer using output timing signals from a global satellite system, said processing system comprising:
means for detecting output signals from at least two satellite sources of the global satellite system;
means for processing and phase correlating said satellite signals to generate a single absolute time reference signal;
interface means disposed in each said computer for receiving said reference signal;
means disposed in each said computer for adapting said signal as an internal master clock for the operating system of said computer, each said computer having its own discrete clock cycle referenced to said absolute time reference signal and comprising a time segment representing a specific unit of time which is assigned to a specific computer address;
means linking said computers to each other through the global communications network and timed by said computer clock cycles to synchronize the internal master clocks of said computers to identify said computer by said specific computer address in the global communications network to permit uninhibited non-buffered data access between any said linked computers; and
means for synchronizing and coordinating processing tasks to segment and distribute them to said plurality of synchronized computers to enhance the speed of said system.

27. A neural network of distributed interacting computers synchronized utilizing a common timing system, said neural network comprising:
a common timing reference for generating a single absolute time reference signal;
a plurality of interconnected first processing nodes each containing a plurality of individual computers, each said computer including interface means disposed for receiving said reference signal;

a plurality of interconnected second processing nodes each containing a plurality of individual computer servers, each said computer server including interface means disposed for receiving said reference signal;

a plurality of interconnected third processing nodes each containing a plurality of individual computer servers, each said computer server including interface means disposed for receiving said reference signal; and a neural network interconnecting said first, second and third nodes adapted to synchronize said nodes to said absolute time reference signal.

28. The synchronized timing system as claimed in claim 27, wherein said common timing reference for generating a single absolute time reference signal comprises a global satellite system.

29. The synchronized timing system as claimed in claim 28, wherein said system further comprises means for detecting uncorrected output signals from at least two satellites of said satellite system; and means for processing and correlating said uncorrected satellite signals to generate said single absolute time reference signal.

30. The neural network as claimed in claim 27, wherein said neural network further includes means disposed in each said computer and computer server for adapting said signal as an internal master clock reference for the operating system of said computer and server, each having its own discrete clock cycle referenced to said absolute time reference signal.

31. The neural network as claimed in claim 30, wherein each said computer and computer server includes data transmission means linking said computers and servers to each other through the global communications network and timed by said computer clock cycles to synchronize the internal master clocks of said computers and servers and to permit uninhibited non-buffered data access between any said linked computers and servers in the neural network.

32. The neural network as claimed in claim 31, wherein each said computer clock cycle comprises a time segment representing a specific unit of time which is assigned to a specific computer address to identify said computer or server in the global communications network to permit uninhibited non-buffered data access between any said linked computers and servers.

33. The neural network as claimed in claim 32, wherein said specific unit of time comprises no greater than a nanosecond.

34. An antennae assembly for synchronizing a plurality of interactive computers using differential signals from a plurality of satellite sources of a global satellite system, said antennae assembly comprising:

mounting means including at least one mounting arm of specified known length;

an antennae receiver member disposed at each end of said mounting arm, each said receiver member being adapted to detect the differential signals from a plurality of said satellite sources;

means for maintaining the horizontal alignment of said mounting member in one plane; and means for processing and phase correlating said signals based on the known length of said mounting member to generate a single absolute time reference signal therefrom.

35. The antennae assembly as claimed in claim 34, wherein said mounting means comprises a pair of mounting arms aligned substantially perpendicular to each other in the same plane.

36. The antennae assembly as claimed in claim 35, wherein said mounting arms are mounted on a gyro to maintain the attitude thereof.

37. The antennae assembly as claimed in claim 35, wherein said mounting arms are retractable.

38. The antennae assembly as claimed in claim 34, wherein the specific unit of time for said single absolute time reference signal comprises no greater than a nanosecond.

39. A method of time synchronizing a plurality of network linked computers with each other utilizing a global satellite system, said method comprising:

receiving and detecting out-of-phase signals from a plurality of satellite sources of the global satellite system;

processing and phase correlating said signals to generate a single absolute time reference signal therefrom;

directing said reference signal to the interface of each said computer;

adapting said signal within each said computer as the internal master clock reference for the operating system of said computer; and interconnecting said computers in the network of computers to synchronize the internal master clocks of said computers to said absolute time reference signal to create a plurality of network interconnected time synchronized computers.

40. The method as claimed in claim 39, wherein said plurality of network linked computers comprises an intranet of computers, and wherein said computers are interconnected to synchronize the internal master clocks of said computers by local area network connection members interconnecting the interfaces of said computers with each other and with the means for receiving and detecting out-of-phase signals.

41. The method as claimed in claim 39, wherein said plurality of computers comprise a plurality of said networks of computers in a distributed system linked together by a global communications system, and wherein each said computer in each said network has its own discrete clock cycle referenced to said absolute time reference signal, each individual computer including data transmission means timed by said clock cycle to permit uninhibited non-buffered data access to any other said linked computer.

42. The method as claimed in claim 41, wherein the discrete clock cycle referenced to said absolute time reference signal of each said computer is selected to be a time segment representing a specific unit of time within a specific block of time which unit is assigned to a specific computer address and which block of time is assigned to a specific function subnetwork within said linked network of computers.

* * * * *